US012151486B2

(12) United States Patent
Otsuka

(10) Patent No.: US 12,151,486 B2
(45) Date of Patent: Nov. 26, 2024

(54) TABLE MOVER AND INK JET PRINTER INCLUDING THE SAME

(71) Applicant: Roland DG Corporation, Hamamatsu (JP)

(72) Inventor: Teruma Otsuka, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 166 days.

(21) Appl. No.: 18/086,243

(22) Filed: Dec. 21, 2022

(65) Prior Publication Data

US 2023/0271436 A1 Aug. 31, 2023

(30) Foreign Application Priority Data

Dec. 22, 2021 (JP) ................................ 2021-208226
Dec. 21, 2022 (JP) ................................ 2022-204473

(51) Int. Cl.
*B41J 29/06* (2006.01)

(52) U.S. Cl.
CPC .................................... *B41J 29/06* (2013.01)

(58) Field of Classification Search
CPC . B41J 2/18; B41J 2/1404; B41J 2/1433; B41J 2/14112; B41J 2/05; B41J 2002/14475; B41J 29/06; C09D 11/40
See application file for complete search history.

(56) References Cited

U.S. PATENT DOCUMENTS

2014/0253635 A1 9/2014 Sakakibara
2023/0226832 A1* 7/2023 Momose ................ B41J 25/001 347/104

FOREIGN PATENT DOCUMENTS

JP 2014-172317 A 9/2014
JP 2020-151996 A 9/2020
JP 2020-157487 A 10/2020

* cited by examiner

*Primary Examiner* — Thinh H Nguyen
(74) *Attorney, Agent, or Firm* — Keating & Bennett, LLP

(57) ABSTRACT

A table mover includes a table assembly including a table carriage to support a table, and the table assembly is movable in sub-scanning directions along a first slide rail fixed to a left side frame and a second slide rail fixed to a right side frame. The table carriage includes a first left fixer to which a left fixing bracket coupled to a left slider to be engaged with the first slide rail is fixed and a first right fixer to which a right fixing bracket coupled to a right slider to be engaged with a second slide rail is fixed. The first left fixer is elastically deformable in main scanning directions relative to the left side frame.

20 Claims, 17 Drawing Sheets

TABLE MOVER AND INK JET PRINTER INCLUDING THE SAME

CROSS REFERENCE TO RELATED APPLICATIONS

This application claims the benefit of priority to Japanese Patent Application No. 2021-208226 filed on Dec. 22, 2021 and Japanese Patent Application No. 2022-204473 filed on Dec. 21, 2022. The entire contents of these applications are hereby incorporated herein by reference.

BACKGROUND OF THE INVENTION

1. Field of the Invention

The present invention relates to a table mover and an ink jet printer including the table mover.

2. Description of the Related Art

JP2020-151996A, for example, discloses a printer including a guide rail extending in main scanning directions, a carriage slidably disposed on guide rails, an ink head mounted on the carriage, a table on which a medium is placed, and a table unit that moves the table in sub-scanning directions orthogonal to the main scanning directions in a plan view. In the printer of JP2020-151996A, the ink head discharges ink onto the medium on the table while moving in the main scanning directions. The medium on the table is then caused to move by the table unit in the sub-scanning directions. This process is repeatedly performed so that a given image is thereby printed on the medium.

In the table mover described in JP2020-151996A, the table unit is movably disposed on a pair of slide rails extending in the sub-scanning directions. The slide rails are individually provided on side walls of a sub-base member disposed on a base member.

SUMMARY OF THE INVENTION

In the table mover disclosed in JP2020-151996A, dimensional errors of members are eliminated by deforming the side walls of the sub-base member to which the slide rails are attached. This deformation of the side walls of the sub-base member enables appropriate attachment of the table unit to the slide rails, and thus, the table unit can move smoothly along the slide rails. Thus, in the table mover of JP2020-151996A, the side walls of the sub-base member separately provided from the base member are deformed in order to eliminate the dimensional errors, and the sub-base member is essential. On the other hand, if the guide rails could be attached directly to the side walls of the base member instead of the sub-base member, the sub-base member is unnecessary, and weight reduction and cost reduction of the printer due to a reduced number of parts would be achieved. However, since the side walls of the base member support the guide rails, the side walls cannot be deformed. In view of this, the dimensional errors cannot be eliminated by deforming the base member, resulting in the problem of difficulty in achieving weight reduction and cost reduction of the printer by omitting the sub-base member.

Preferred embodiments of the present invention provide table movers that each move a table assembly smoothly along slide rails.

A table mover according to a preferred embodiment of the present invention includes a base including a bottom wall, a first side wall extending upward from the bottom wall in a first direction, and a second side wall extending upward from the bottom wall in the first direction and separated from the first side wall in a second direction, the second direction being perpendicular or substantially perpendicular to the first direction in a plan view, a first slide rail fixed to the first side wall and extending in the first direction, a second slide rail fixed to the second side wall and extending in the first direction, a table assembly including a table on which a recording medium is placeable and a table carriage to support the table, the table assembly being movable in the first direction along the first slide rail and the second slide rail, a first slider to be engaged with the first slide rail and to support the table carriage such that the table carriage is movable in the first direction along the first slide rail, a second slider to be engaged with the second slide rail and to support the table carriage such that the table carriage is movable in the first direction along the second slide rail, a first fixing bracket to couple the first slider and the table carriage to each other, and a second fixing bracket to couple the second slider and the table carriage to each other. The table carriage includes a first fixer and a second fixer, the first fixer being provided at one side in the second direction, the first fixing bracket being fixed to the first fixer, the second fixer being provided at another side in the second direction, the second fixing bracket being fixed to the second fixer. The first fixer is more easily elastically deformed in the second direction than the second fixer.

In a table mover according to a preferred embodiment of the present invention, the first slide rail extending in the first direction is fixed to the first side wall of the base extending in the first direction, and the second slide rail extending in the first direction is fixed to the second side wall of the base extending in the first direction. In this manner, the entirety of the first slide rail and the second slide rail is fixed to the first side wall and the second side wall, respectively, of the base. Thus, the first slide rail and the second slide rail have high longitudinal stiffness. Accordingly, even when the table assembly moves along the first slide rail and the second slide rail, deflection of the first slide rail and the second slide rail is reduced or prevented. That is, while the table assembly including the table moves in the first direction, the table assembly moves smoothly along the first slide rail and the second slide rail. The first fixer of the table carriage is more easily elastically deformed in the second direction than the second fixer. Thus, in attaching the table assembly to the first slide rail and the second slide rail, even if the structural elements have dimensional errors, deformation of the first fixer can eliminate the dimensional errors. In this manner, the table assembly can be appropriately attached to the first slide rail and the second slide rail by elastically deforming the first fixer more greatly than the second fixer, and thus, the table assembly moves smoothly along the first slide rail and the second slide rail.

A table mover according to another preferred embodiment of the present invention includes a base including a bottom wall, a first side wall extending upward from the bottom wall in a first direction, and a second side wall extending upward from the bottom wall in the first direction and separated from the first side wall in a second direction, the second direction being perpendicular or substantially perpendicular to the first direction in a plan view, a first slide rail fixed to the first side wall and extending in the first direction, a second slide rail fixed to the second side wall and extending in the first direction, a table assembly including a table on which a recording medium is placeable and a table carriage to support the table, the table assembly being movable in the first direction along the first slide rail and the second slide rail, a first slider to be engaged with the first slide rail and to support the table carriage such that the table carriage is movable in the first direction along the first slide rail, a second slider to be engaged with the second slide rail and to support the table carriage such that the table carriage is movable in the first direction along the second slide rail, a first fixing bracket to couple the first slider and the table carriage to each other, and a second fixing bracket to couple the second slider and the table carriage to each other. The table carriage includes a first fixer and a second fixer, the first fixer being provided at one side in the second direction, the first fixing bracket being fixed to the first fixer, the second fixer being provided at another side in the second direction, the second fixing bracket being fixed to the second fixer. The first fixing bracket is more easily elastically deformed in the second direction than the second fixing bracket.

In a table mover according to another preferred embodiment of the present invention, the first slide rail extending in the first direction is fixed to the first side wall of the base extending in the first direction, and the second slide rail extending in the first direction is fixed to the second side wall of the base extending in the first direction. In this manner, the entirety of the first slide rail and the second slide rail is fixed to the first side wall and the second side wall, respectively, of the base. Thus, the first slide rail and the second slide rail have high longitudinal stiffness. Accordingly, even when the table assembly moves along the first slide rail and the second slide rail, deflection of the first slide rail and the second slide rail is reduced or prevented. That is, while the table assembly including the table moves in the first direction, the table assembly moves smoothly along the first slide rail and the second slide rail. The first fixing bracket is more easily elastically deformed in the second direction than the second fixing bracket. Thus, in attaching the table assembly to the first slide rail and the second slide rail, even if the structural elements have dimensional errors, deformation of the first fixing bracket can eliminate the dimensional errors. In this manner, the table assembly can be appropriately attached to the first slide rail and the second slide rail by elastically deforming the first fixing bracket more greatly than the second fixing bracket, and thus, the table assembly moves smoothly along the first slide rail and the second slide rail.

Preferred embodiments of the present invention provide table movers that each moves a table assembly smoothly along slide rails.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
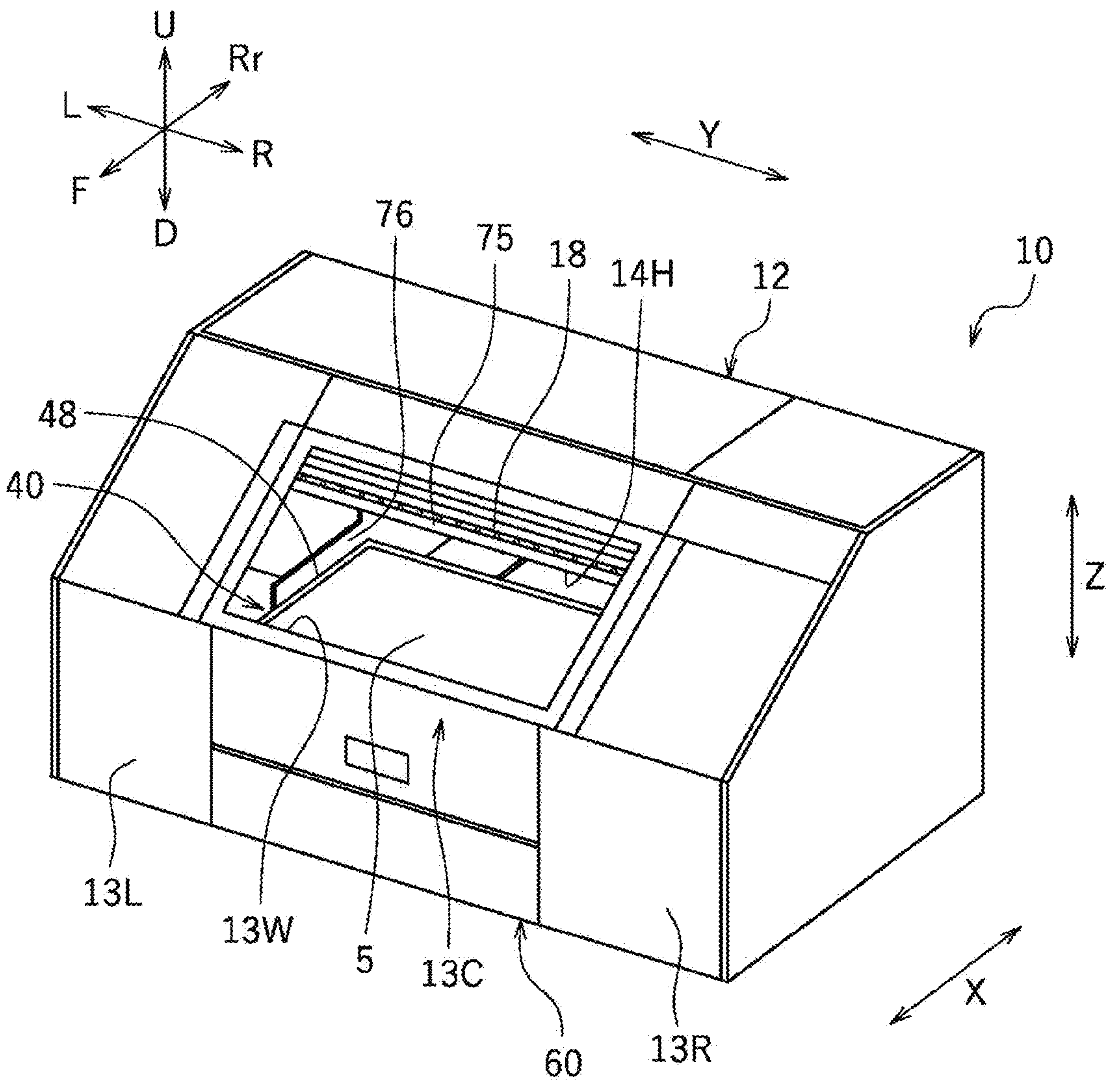
FIG. 1 is a perspective view of a printer according to a preferred embodiment of the present invention.

Table movers and ink jet printers (hereinafter referred to simply as a "printer") according to preferred embodiments of the present invention will be described with reference to the drawings. The preferred embodiments described herein are, of course, not intended to particularly limit the present invention. Elements and features having the same functions are denoted by the same reference characters, and description for the same elements and features will not be repeated or will be simplified as appropriate.

First Preferred Embodiment

FIG. 1 is a perspective view of a printer 10 according to this preferred embodiment. In the following description, when a user sees the printer 10 from the front, a direction away from the printer 10 will be referred to as forward, and a direction toward the printer 10 will be referred to as rearward. Left, right, up, and down respectively refer to left, right, up, and down when the printer 10 is seen from the front. Characters F, Rr, L, R, U, and D in the drawings represent front, rear, left, right, up, and down, respectively. Character Y represents main scanning directions in the drawings. The main scanning directions Y herein are left-right directions. The main scanning directions Y are an example of second directions. Character X represents sub-scanning directions. The sub-scanning directions X herein are front-rear directions, and are perpendicular or substantially perpendicular to the main scanning directions Y in a plan view. The sub-scanning directions X are an example of first directions. Character Z represents vertical directions. The vertical directions Z are examples of third directions. It should be noted that the directions described above are defined simply for convenience, and are not intended to limit the state of installation of the printer 10 and do not limit the present invention.

As illustrated in FIG. 1, the printer 10 is an ink jet printer. The printer 10 is elongated in the main scanning directions Y as compared to household printers, and is a so-called large-size printer. For example, the printer 10 is a business-use printer. In this preferred embodiment, the printer 10 prints an image on a recording medium 5.

The recording medium 5 used in this preferred embodiment may be, for example, a flat sheet such as a recording sheet or a transfer paper or a three-dimensional object such as various types of cases including a cellular phone case, a small electronic device, small articles including a keyholder, a photo frame, and a pen, an everyday item, and an accessory. A material for the recording medium 5 may be, as well as papers such as plain paper and ink jet printing paper, a resin material such as polyvinyl chloride, acrylic resin, polycarbonate, polystyrene, or acrylonitrile butadiene styrene (ABS) copolymer, a metal material such as aluminum or stainless steel, carbon, a ceramic, ceramic, glass, rubber, leather, wood, and so forth.

Figure 2:
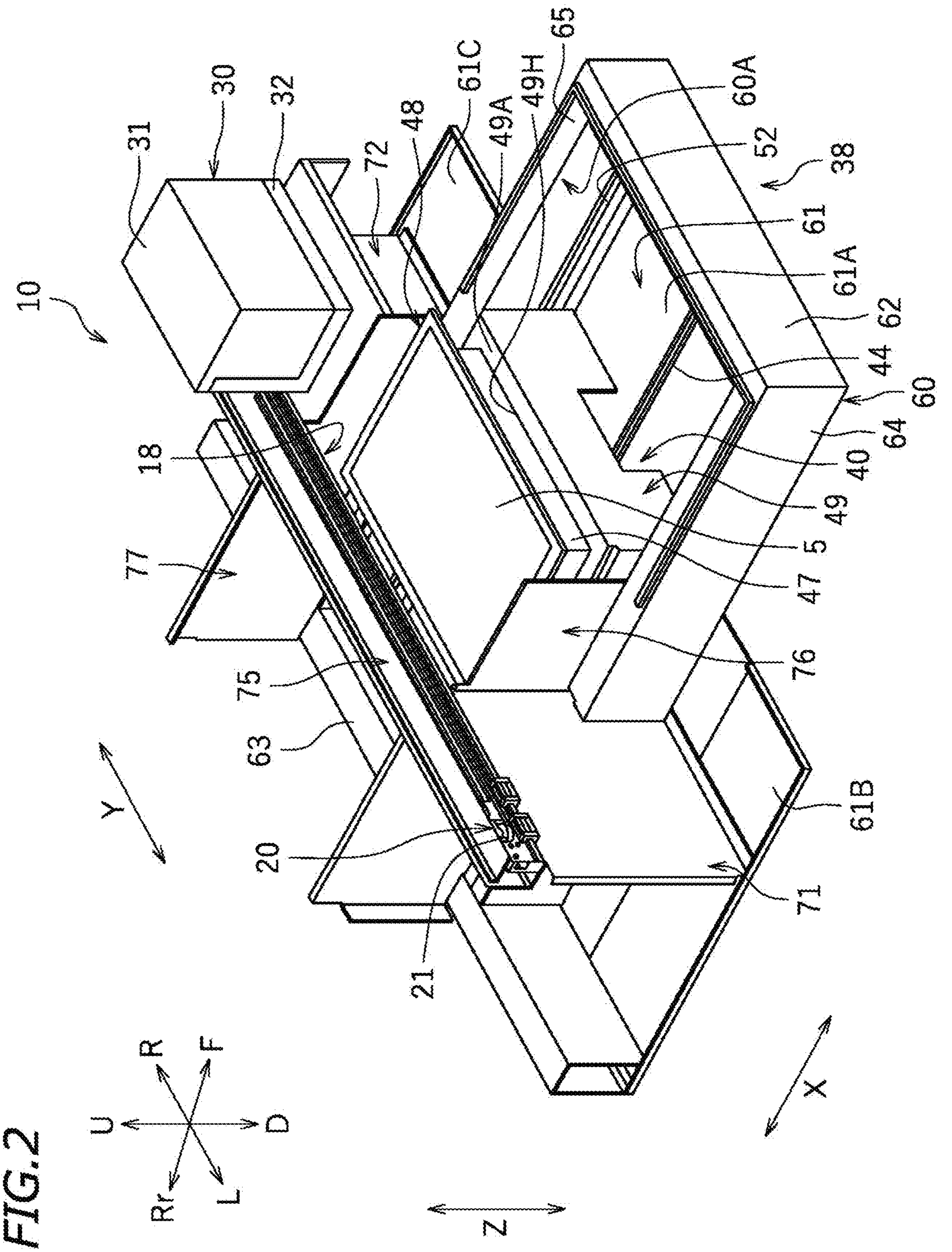
FIG. 2 is a front perspective view of a printer according to a preferred embodiment of the present invention from which a body case is detached.

As illustrated in FIG. 2, the printer 10 includes a body case 12 (see FIG. 1), a carriage mover 20, an ink head unit 30, and a table mover 38. The table mover 38 includes a base member 60 supporting the carriage mover 20 and the ink head unit 30, a table unit 40 (table assembly) on which a recording medium 5 is placed, a first slide rail 51 (see FIG. 4) supporting the table unit 40 such that the table unit 40 is movable in the sub-scanning directions X, a second slide rail 52 (see also FIG. 4) supporting the table unit 40 such that the table unit 40 is movable in the sub-scanning directions X, a moving device 41 (see FIG. 4) that moves the table unit 40 in the sub-scanning directions X, and a guide member 80 (see FIG. 5) that guides movement of the table unit 40 along the first slide rail 51 and the second slide rail 52.

Figure 4:
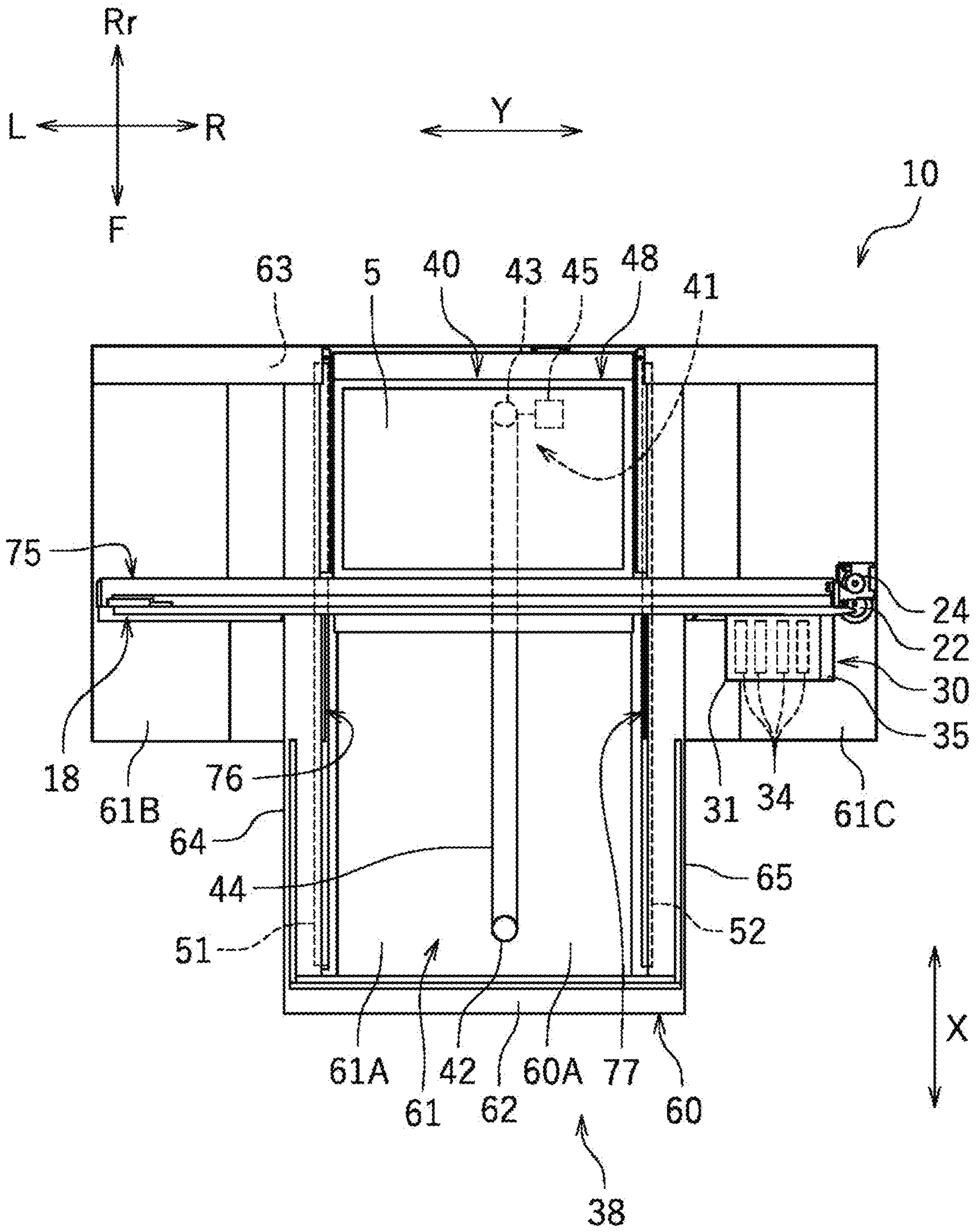
FIG. 4 is a plan view of a printer according to a preferred embodiment of the present invention from which a body case is detached.

As illustrated in FIG. 2, the base member 60 includes a base plate 61, a front frame 62, a rear frame 63, a left side frame 64, and a right side frame 65. The base plate 61 has a center base portion 61A having a plate shape and located at the center, a left base portion 61B having a plate shape and located leftward of the center base portion 61A, and a right base portion 61C having a plate shape and located rightward of the center base portion 61A. The left base portion 61B supports a first support wall 71 described later. The right base portion 61C supports a second support wall 72 described later. As illustrated in FIG. 4, each of the center base portion 61A, the left base portion 61B, and the right base portion 61C is longer in the sub-scanning directions X than in the main scanning directions Y. The length of the center base portion 61A in the sub-scanning directions X is longer than those of the left base portion 61B and the right base portion 61C in the sub-scanning directions X. The base plate 61 is an example of a bottom wall. The front frame 62 extends upward from the front end of the center base portion 61A of the base plate 61. The front frame 62 extends in the main scanning directions Y. The rear frame 63 extends upward from the rear end of the base plate 61. That is, the rear frame 63 extends upward from the rear end of the center base portion 61A, the rear end of the left base portion 61B, and the rear end of the right base portion 61C. The rear frame 63 extends in the main scanning directions Y. The left side frame 64 extends upward from the left end of the center base portion 61A. The left side frame 64 extends in the sub-scanning directions X. The left side frame 64 connects the front frame 62 and the rear frame 63 to each other. The left side frame 64 is located rightward of the left base portion 61B. The left side frame 64 supports a left side wall 76 described later. The left side frame 64 is an example of a first side wall. The right side frame 65 extends upward from the right end of the center base portion 61A. The right side frame 65 extends in the sub-scanning directions X. The right side frame 65 connects the front frame 62 and the rear frame 63 to each other. The right side frame 65 is located leftward of the right base portion 61C. The right side frame 65 is separated from the left side frame 64 along the main scanning directions Y. The right side frame 65 is located rightward of the left side frame 64. The right side frame 65 supports a right side wall 77 described later. The right side frame 65 is an example of a second side wall. The base member 60 has housing space 60A surrounded by the center base portion 61A of the base plate 61, the front frame 62, the rear frame 63, the left side frame 64, and the right side frame 65. The housing space 60A has a box shape that is open at the top, and houses the table unit 40.

As illustrated in FIG. 1, a front cover 13C is provided at the center of a front portion of the body case 12. A left cover 13L is provided at the left of a front portion of the body case 12. A right cover 13R is provided at the right of the front portion of the body case 12. The front cover 13C, the left cover 13L, and the right cover 13R are openable and closable with respect to the body case 12. The front cover 13C has a window 13W. The window 13W is formed of, for example, a transparent acrylic plate. An operator can visually recognize the inside of the body case 12 through the window 13W. The base member 60 is attached to a lower portion of the body case 12. The body case 12 is supported by the base member 60.

As illustrated in FIG. 2, the printer 10 includes the first support wall 71, the second support wall 72, a support member 75 bridged between the first support wall 71 and the second support wall 72, the left side wall 76, and the right side wall 77. The first support wall 71 is located leftward of the table unit 40 of the table mover 38. The first support wall 71 is fixed to the left base portion 61B of the base plate 61 and the left side frame 64. The first support wall 71 extends in the vertical directions Z and the main scanning directions Y. The second support wall 72 is located rightward of the table unit 40. The second support wall 72 is fixed to the right base portion 61C of the base plate 61 and the right side frame 65. The second support wall 72 extends in the vertical directions Z and the main scanning directions Y.

Figure 3:
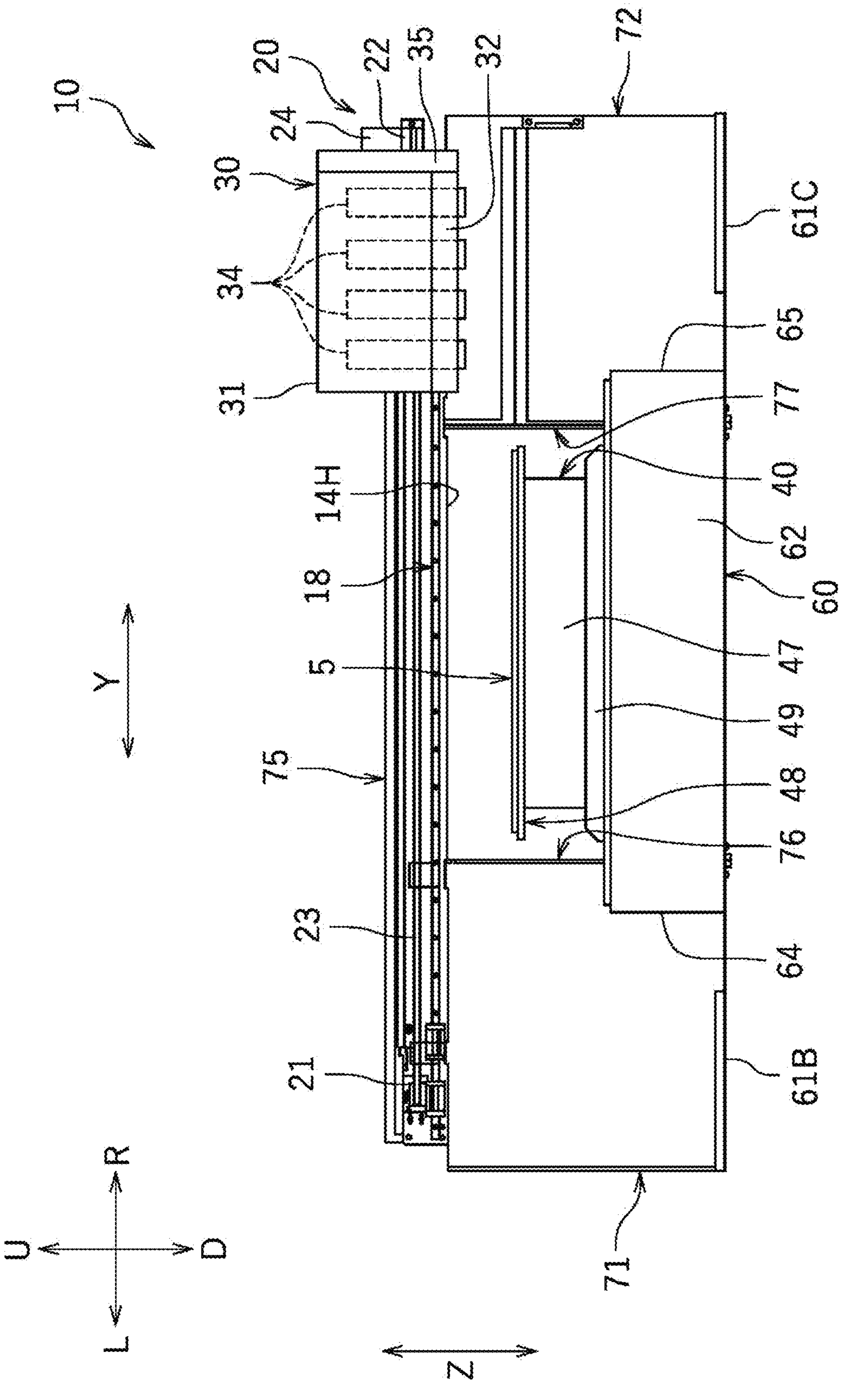
FIG. 3 is a front view of a printer according to a preferred embodiment of the present invention from which a body case is detached.

As illustrated in FIG. 2, the support member 75 extends in the main scanning directions Y. The support member 75 is located above the table unit 40. The support member 75 is fixed to the first support wall 71 and the second support wall 72. As illustrated in FIG. 3, the printer 10 has an opening 14H through which the table unit 40 passes in the sub-scanning directions X. The opening 14H is surrounded by the support member 75, the left side wall 76, and the right side wall 77. The left side wall 76 is located leftward of the table unit 40 and rightward of the first support wall 71. The right side wall 77 is located rightward of the table unit 40 and leftward of the second support wall 72. As illustrated in FIG. 4, each of the left side wall 76 and the right side wall 77 extends in the sub-scanning directions X and the vertical directions Z. The left side wall 76 is fixed to the left side frame 64. The right side wall 77 is fixed to the right side frame 65. The left side wall 76 and the right side wall 77 support the support member 75.

As illustrated in FIG. 2, the printer 10 includes a guide rail 18 provided on the support member 75. The guide rail 18 extends in the main scanning directions Y. The guide rail 18 projects forward from the support member 75. The guide rail 18 is located above the table unit 40. The guide rail 18 is located above the opening 14H (see FIG. 3). A carriage 32 described later of the ink head unit 30 is slidably provided on the guide rail 18. The guide rail 18 guides movement of the carriage 32 in the main scanning directions Y.

As illustrated in FIG. 2, the carriage mover 20 moves the carriage 32 in the main scanning directions Y relative to the recording medium 5 on a table 48 described later of the table unit 40. The carriage mover 20 moves the carriage 32 in the main scanning directions Y. A configuration of the carriage mover 20 is not specifically limited. As illustrated in FIG. 3, the carriage mover 20 includes a left pulley 21, a right pulley 22, an endless belt 23, and a carriage motor 24. The left pulley 21 is disposed rightward of the left end of the guide rail 18. The right pulley 22 is disposed rightward of the right end of the guide rail 18. The left pulley 21 and the right pulley 22 are fixed to the support member 75. The belt 23 is wound around the left pulley 21 and the right pulley 22. The carriage motor 24 is connected to the right pulley 22. Alternatively, the carriage motor 24 may be connected to the left pulley 21. In this example, the carriage motor 24 is driven and the right pulley 22 rotates to cause the belt 23 to run between the left pulley 21 and the right pulley 22.

As illustrated in FIG. 3, the ink head unit 30 is disposed above the table unit 40. The ink head unit 30 includes the carriage 32, a plurality of ink heads 34 provided on the carriage 32, a case 31 attached to the carriage 32, and an optical illumination device 35. The case 31 has a box shape. The case 31 houses the ink heads 34.

The carriage 32 is attached to the belt 23. The carriage 32 is slidably engaged with the guide rail 18. As illustrated in FIG. 3, the carriage 32 is disposed above the table 48 described later. The belt 23 runs by driving the carriage motor 24 to cause the carriage 32 to move in the main scanning directions Y, and accordingly, the ink heads 34 and the optical illumination device 35 mounted on the carriage 32 move in the main scanning directions Y.

As illustrated in FIG. 4, the ink heads 34 are longer in the sub-scanning directions X than in the main scanning directions Y. The ink heads 34 have the same shape and the same size. The ink heads 34 discharge ink onto the recording medium 5 on the table 48. The ink heads 34 include a plurality of nozzles (not shown) that discharge ink and are arranged in the sub-scanning directions X, and a nozzle surface (not shown) having the nozzles. Ink discharged from the nozzles of the ink heads 34 is, for example, photocurable ink. Examples of the photocurable ink include ultraviolet (UV) curable ink. The UV curable ink cures upon application of ultraviolet rays. In this preferred embodiment, the ink head unit 30 includes four ink heads 34, but the present invention is not limited to this example.

The optical illumination device 35 applies light (e.g., ultraviolet rays) onto photocurable ink (e.g., UV curable ink) discharged onto the recording medium 5. As illustrated in FIG. 3, the optical illumination device 35 is disposed rightward of the ink heads 34. The optical illumination device 35 is fixed to the carriage 32. Although the optical illumination device 35 is disposed rightward of the ink heads 34 in this preferred embodiment, the present invention is not limited to this example. The optical illumination device 35 may be disposed leftward of the ink heads 34. The optical illumination device 35 may be disposed both leftward and rightward of the ink heads 34.

As illustrated in FIG. 2, the table mover 38 moves the table 48 of the table unit 40 in the sub-scanning directions X. The table mover 38 also moves the table 48 in the vertical directions Z. The table unit 40 includes the table 48 on which the recording medium 5 is placed, a table carriage 49, an elevation case 47, and a fixing bracket 55 (see FIG. 5). The table unit 40 is supported by a left slide member 81X (slider) described later (see FIG. 5) and a right slide member 82X (slider) described later (see FIG. 6). The table unit 40 is movable in the sub-scanning directions X along the first slide rail 51 (see FIG. 4) and the second slide rail 52 (see also FIG. 4).

As illustrated in FIG. 2, the recording medium 5 is placed on the table 48. The table 48 has a rectangular or substantially rectangular shape that is shorter in the sub-scanning directions X than in the main scanning directions Y. In the table 48, the length in the sub-scanning directions X may be larger than that in the main scanning directions Y, or the length in the sub-scanning directions X may be equal to the length in the main scanning directions Y. As illustrated in FIG. 3, the table 48 may be disposed below the guide rail 18. The table 48 is disposed below the ink head unit 30. The table 48 is fixed to the upper end of the elevation case 47. The table 48 is movable in the sub-scanning directions X with movement of the table carriage 49. The table 48 is movable in the vertical directions Z with movement of the elevation case 47.

Figure 5:
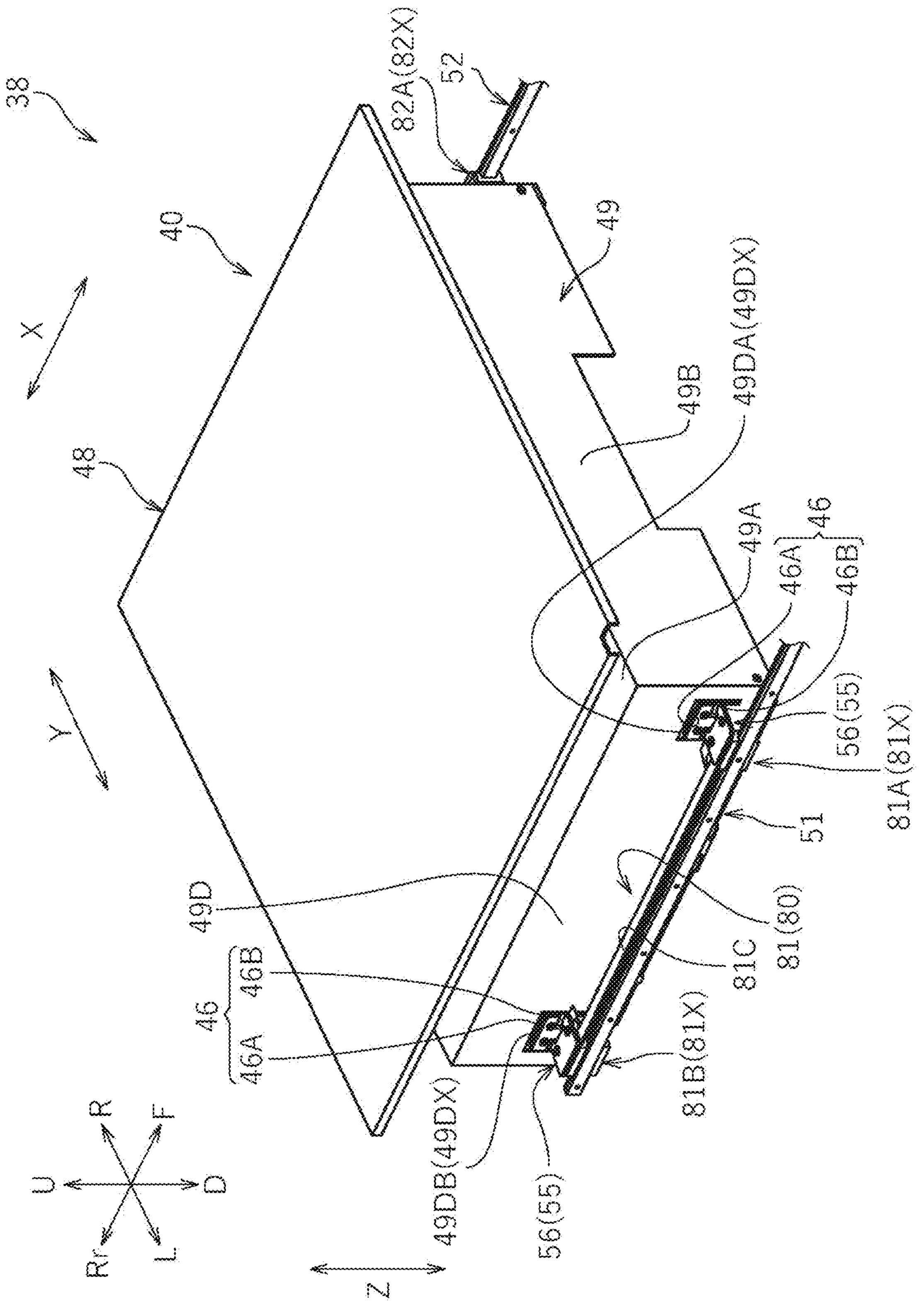
FIG. 5 is a perspective view of a table unit according to a preferred embodiment of the present invention.
Figure 6:
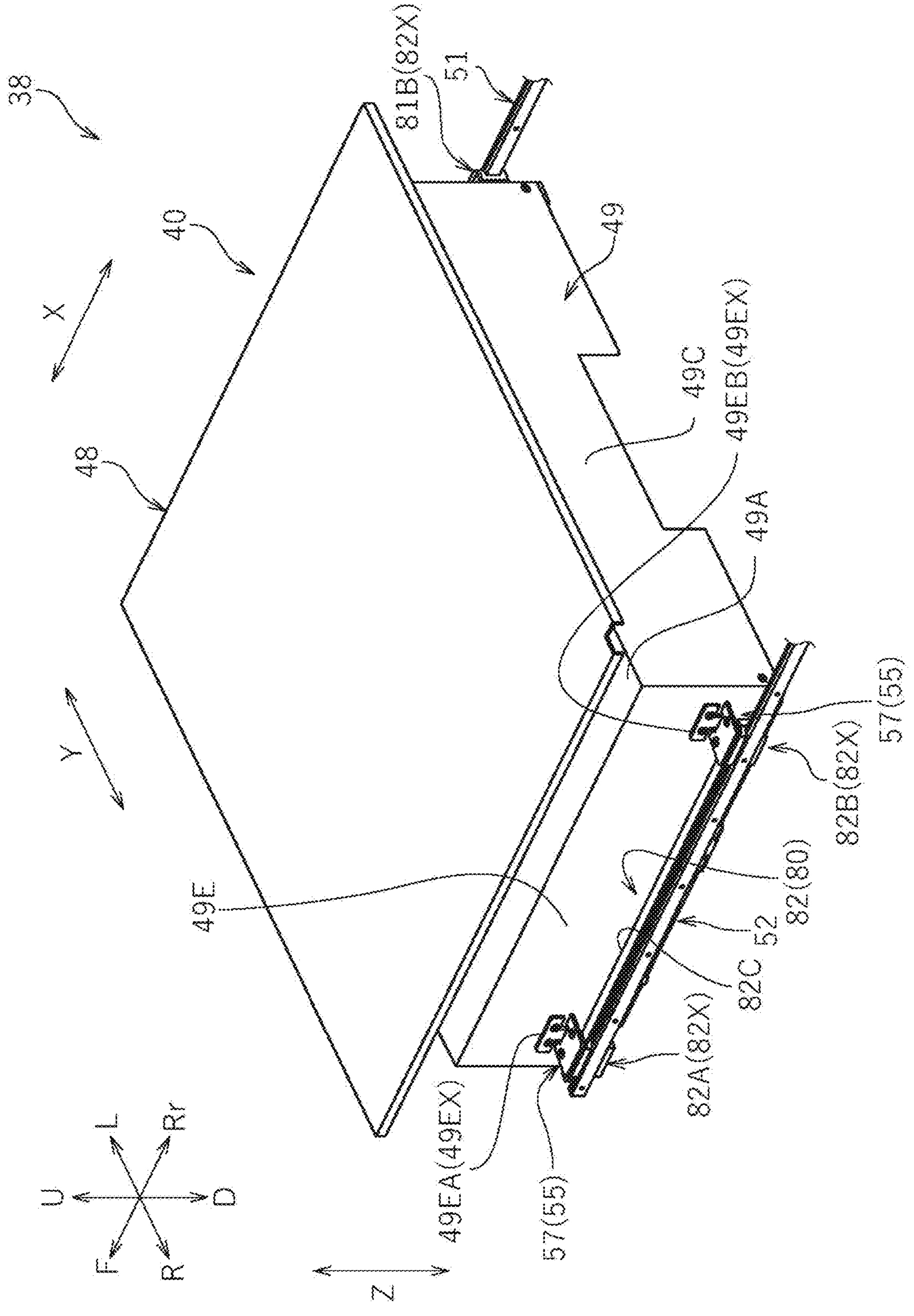
FIG. 6 is a perspective view of a table unit according to a preferred embodiment of the present invention.
Figure 10:
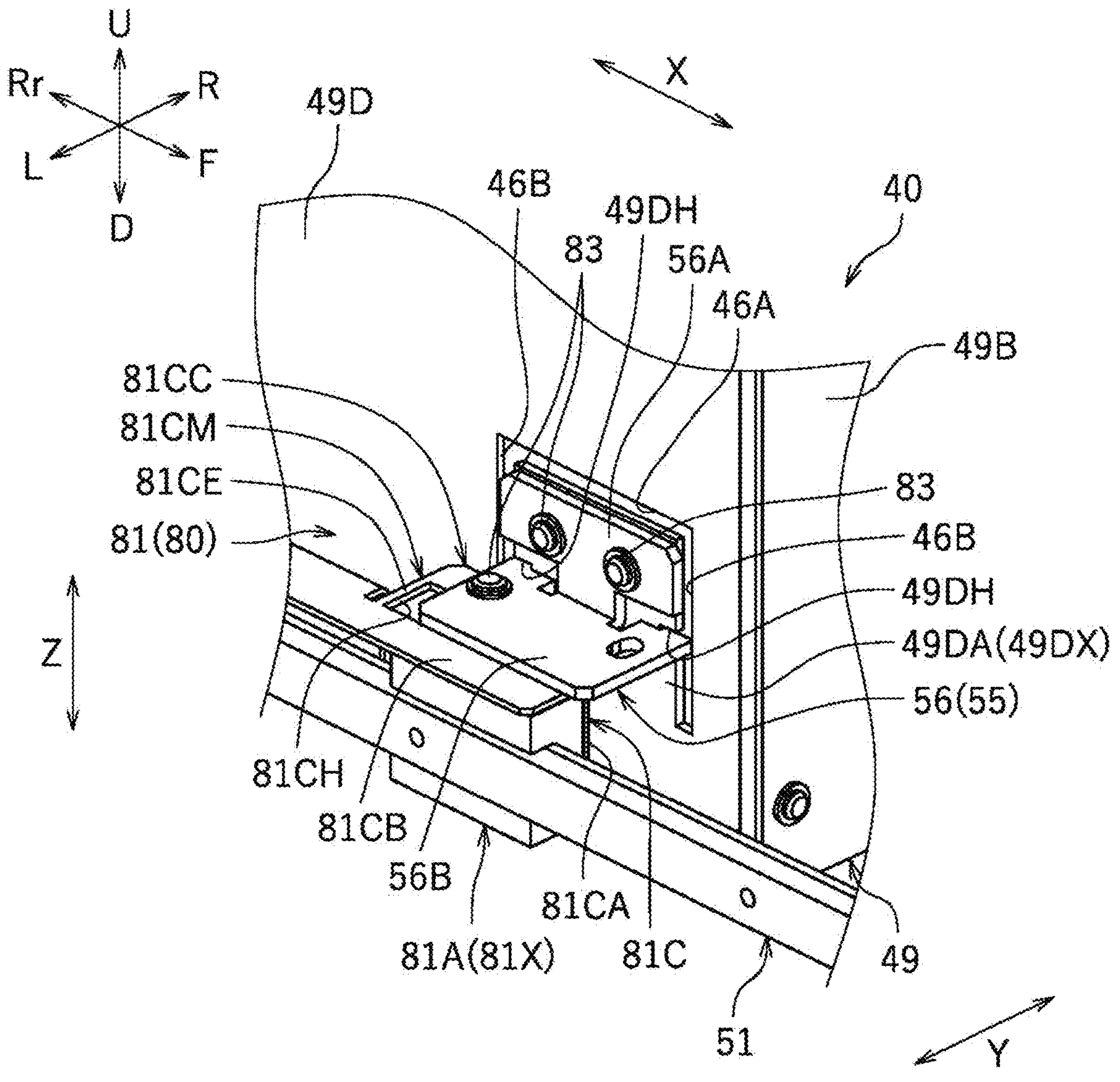
FIG. 10 is a perspective view illustrating a portion of a table unit according to a preferred embodiment of the present invention.
Figure 13:
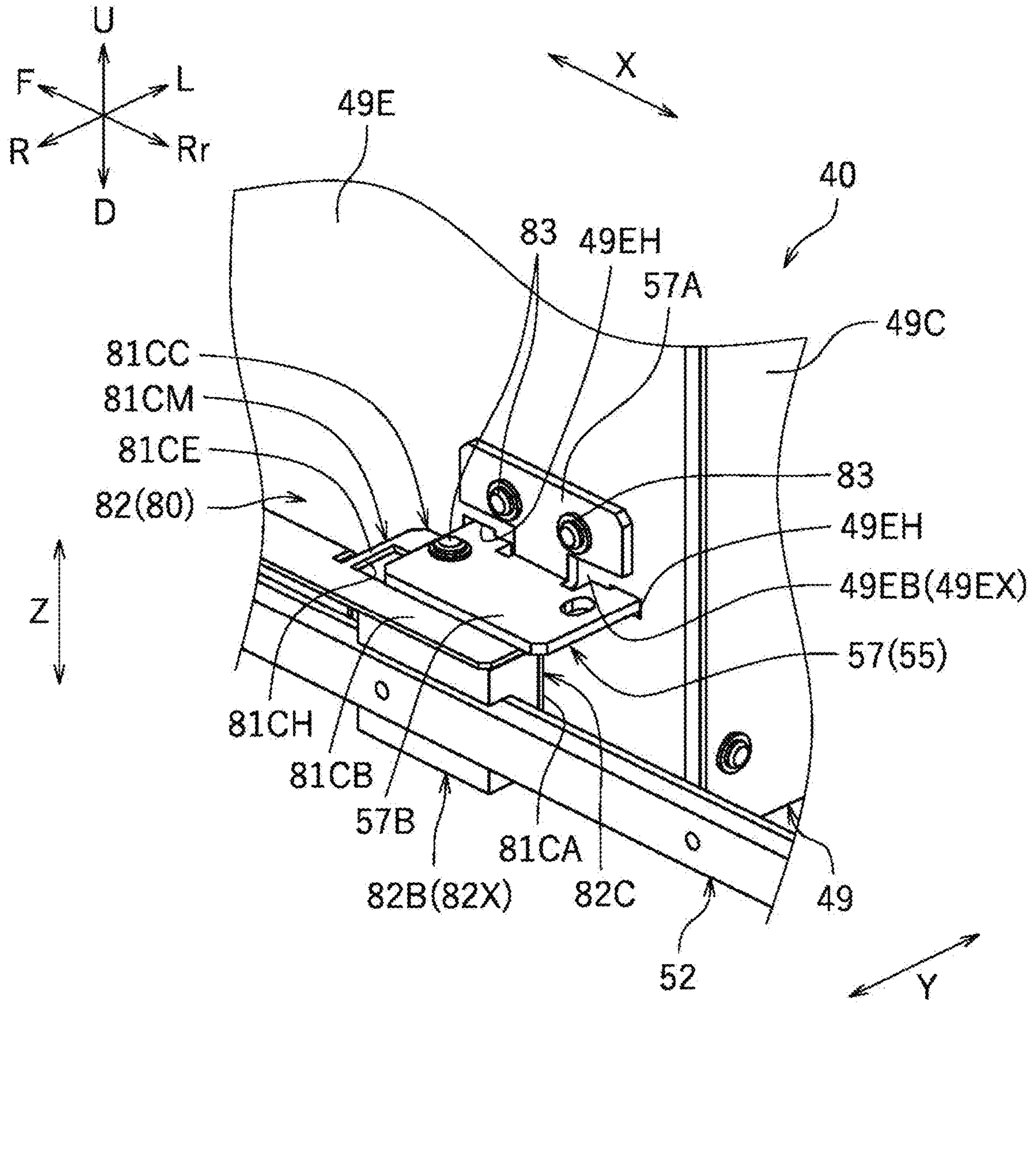
FIG. 13 is a perspective view illustrating a portion of a table unit according to a preferred embodiment of the present invention.

As illustrated in FIG. 2, the table carriage 49 is slidably supported by the first slide rail 51 (see FIG. 4) and the second slide rail 52 (see also FIG. 4). The table carriage 49 is movable in the sub-scanning directions X along the first slide rail 51 and the second slide rail 52. The table carriage 49 supports the table 48 with the elevation case 47 interposed therebetween. The table carriage 49 has a box shape. As illustrated in FIG. 5, the table carriage 49 includes an upper wall 49A, a front wall 49B extending downward from the front end of the upper wall 49A, a rear wall 49C (see FIG. 6) extending downward from the rear end of the upper wall 49A, a left wall 49D extending downward from the left end of the upper wall 49A and connecting the front wall 49B and the rear wall 49C, and a right wall 49E (see FIG. 6) extending downward from the right end of the upper wall 49A and connecting the front wall 49B and the rear wall 49C to each other. The upper wall 49A of the table carriage 49 has an opening 49H (see FIG. 2) that is open upward. The table carriage 49 includes a first left fixer 49DA and a second left fixer 49DB to which a left fixing bracket 56 described later is fixed, and a first right fixer 49EA (see FIG. 6) and a second right fixer 49EB (see FIG. 6) to which a right fixing bracket 57 described later is fixed. The first left fixer 49DA is provided on the front side of the left wall 49D of the table carriage 49, and the second left fixer 49DB is provided on the rear side of the left wall 49D. The first left fixer 49DA and the second left fixer 49DB are elastically deformable in the main scanning directions Y. The first left fixer 49DA and the second left fixer 49DB are elastically deformable in the main scanning directions Y more easily than the first right fixer 49EA and the second right fixer 49EB. The first left fixer 49DA and the second left fixer 49DB are elastically deformable by a notch 46 described later. As illustrated in FIG. 6, the first right fixer 49EA is provided on the front side of the right wall 49E of the table carriage 49, and the second right fixer 49EB is provided on the rear side of the right wall 49E. The first right fixer 49EA and the second right fixer 49EB are elastically deformable in the main scanning directions Y. In the following description, the first left fixer 49DA and the second left fixer 49DB will be collectively referred to as a first fixer 49DX, and the first right fixer 49EA and the second right fixer 49EB will be collectively referred to as a second fixer 49EX. As illustrated in FIG. 10, the first fixer 49DX has a rectangular or substantially rectangular shape. The first fixer 49DX has a recess 49DH in which a portion of a second portion 56B of the left fixing bracket 56 described later is inserted so that the left fixing bracket 56 is positioned to the first fixer 49DX. The second fixer 49EX is a portion of the right wall 49E of the table carriage 49. As illustrated in FIG. 13, the second fixer 49EX has a through hole 49EH in which a portion of a second portion 57B of the right fixing bracket 57 described later is inserted so that the right fixing bracket 57 is positioned to the second fixer 49EX. As illustrated in FIG. 10, the table carriage 49 has the notch 46 extending through a peripheral portion of the first fixer 49DX. The notch 46 penetrates the left wall 49D of the table carriage 49. The notch 46 includes a first notch 46A above the first fixer 49DX and extending in the sub-scanning directions X (front-rear directions in this example), and second notches 46B that are individually disposed at one side (front side in this example) and the other side (rear side in this example) of the first fixer 49DX in the sub-scanning directions X, extend in the vertical directions Z, and are continuous to the first notch 46A. The notch 46 has a U shape or a substantially U shape in a side view. The second notches 46B are continuous with the recess 49DH. In this manner, since the notch 46 extends around the first fixer 49DX, the first fixer 49DX has a lower lateral stiffness than that of the other portion of the left wall 49D. No notch 46 is provided around the second fixer 49EX.

As illustrated in FIG. 2, the elevation case 47 has a box shape. The elevation case 47 is inserted in the opening 49H in the upper wall 49A of the table carriage 49. The elevation case 47 is movable in the vertical directions Z relative to the table carriage 49 by an unillustrated driving mechanism. The elevation case 47 supports the table 48.

As illustrated in FIG. 4, each of the first slide rail 51 and the second slide rail 52 extend in the sub-scanning directions X. The first slide rail 51 is fixed to the left side frame 64 of the base member 60. The expression "the first slide rail 51 is fixed to the left side frame 64" herein includes a case where the first slide rail 51 is directly fixed to the left side frame 64 with a screw or the like and a case where the first slide rail 51 is indirectly fixed to the left side frame 64 with a bracket or the like. The second slide rail 52 is fixed to the right side frame 65 of the base member 60. The expression "the second slide rail 52 is fixed to the right side frame 65" herein includes a case where the second slide rail 52 is directly fixed to the right side frame 65 with a screw or the like and a case where the second slide rail 52 is indirectly fixed to the right side frame 65 with a bracket or the like. The first slide rail 51 and the second slide rail 52 support the table unit 40. The first slide rail 51 and the second slide rail 52 guide movement of the table unit 40 in the sub-scanning directions X.

As illustrated in FIG. 4, the moving device 41 is disposed on the base member 60. The moving device 41 is housed in the housing space 60A of the base member 60. The moving device 41 includes a front pulley 42, a rear pulley 43, an endless belt 44, and a driving motor 45. The front pulley 42 is disposed at a front side of the center base portion 61A. The rear pulley 43 is disposed at a rear side of the center base portion 61A. The belt 44 is wound around the front pulley 42 and the rear pulley 43. The driving motor 45 is connected to the rear pulley 43. Alternatively, the driving motor 45 may be connected to the front pulley 42. In this example, the driving motor 45 is driven to cause the rear pulley 43 to rotate so that the belt 44 runs between the front pulley 42 and the rear pulley 43. The table carriage 49 (see FIG. 2) is attached to the belt 44. Accordingly, when the belt 44 runs by driving the driving motor 45, the table carriage 49 moves in the sub-scanning directions X along the first slide rail 51 and the second slide rail 52. That is, the moving device 41 can move the table 48 in the sub-scanning directions X. FIG. 4 illustrating a state where the table 48 is located most rearward.

As illustrated in FIG. 5, the guide member 80 includes a left guide member 81 that is engaged with the first slide rail 51. The left guide member 81 includes a first left slide member 81A and a second left slide member 81B aligned along the sub-scanning directions X, and a left coupling member 81C retaining the first left slide member 81A and the second left slide member 81B. The first left slide member 81A and the second left slide member 81B are engaged with the first slide rail 51. The first left slide member 81A and the second left slide member 81B are movable in the sub-scanning directions X along the first slide rail 51. The first left slide member 81A and the second left slide member 81B support the table carriage 49 such that the table carriage 49 is movable in the sub-scanning directions X along the first slide rail 51. The first left slide member 81A is located forward of the second left slide member 81B. The first left slide member 81A is fixed to the front end of the left coupling member 81C. The second left slide member 81B is fixed to the rear end of the left coupling member 81C. Thus, the first left slide member 81A and the second left slide member 81B move in the sub-scanning directions X as one unit. In the following description, the first left slide member 81A and the second left slide member 81B will be collectively referred to as the left slide member 81X. The left slide member 81X is an example of a first slide member. The first left slide member 81A is an example of a front first slide member. The second left slide member 81B is an example of a rear first slide member. The left coupling member 81C is an example of a coupling member.

Figure 7:
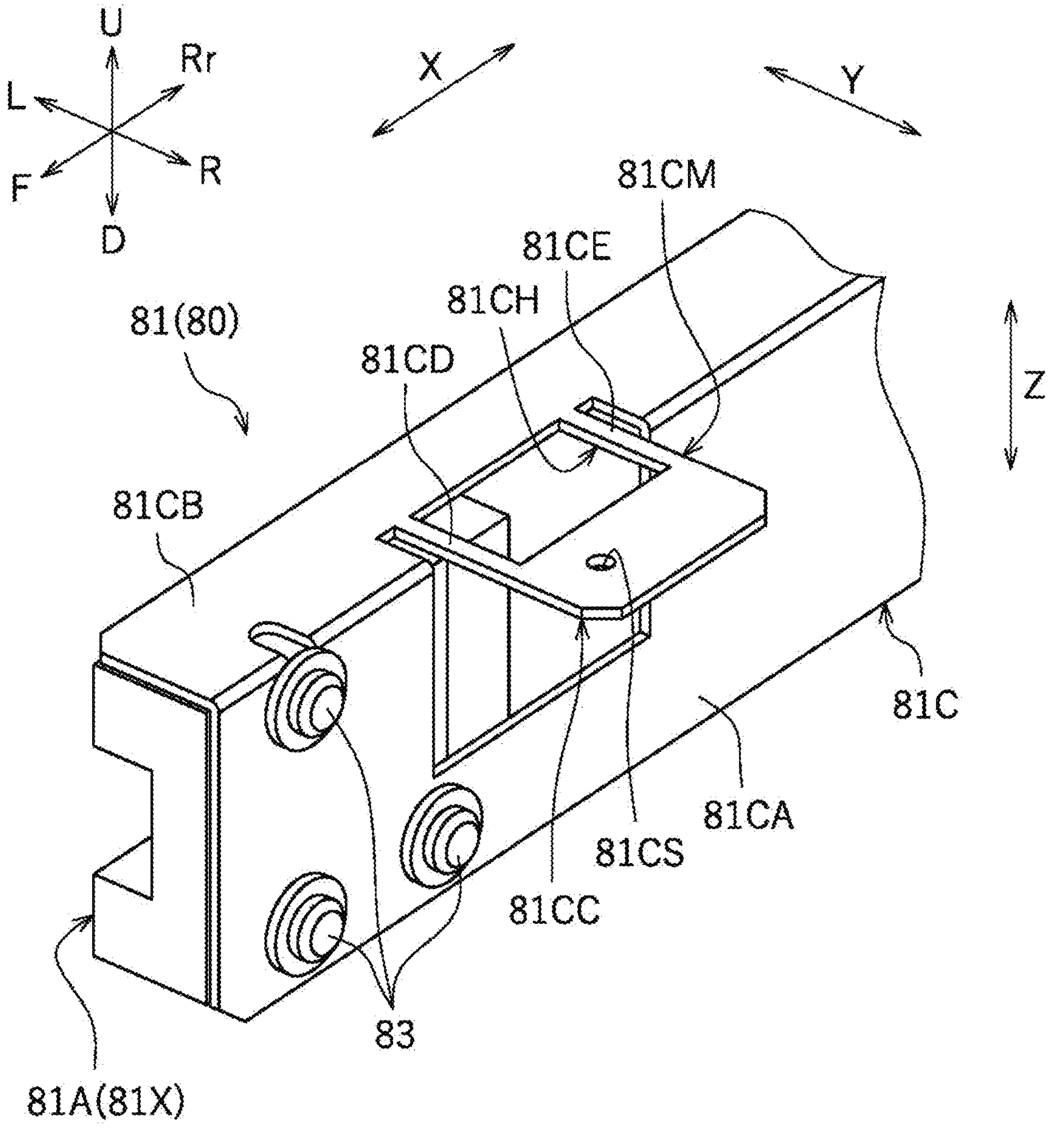
FIG. 7 is a perspective view illustrating a portion of a left slide member according to a preferred embodiment of the present invention.

As illustrated in FIG. 7, the left slide member 81X is a sliding member slidable on the first slide rail 51, and has a U shape or a substantially U shape in cross section. The left slide member 81X is fixed to the left coupling member 81C by a fastening member 83. The left coupling member 81C indirectly couples the left fixing bracket 56 (see FIG. 5) and the left slide member 81X to each other. The left coupling member 81C extends in the sub-scanning directions X. The length of the left coupling member 81C in the sub-scanning directions X is smaller than the length of the left wall 49D of the table carriage 49 in the sub-scanning directions X. The left coupling member 81C includes a vertical wall 81CA extending in the sub-scanning directions X and the vertical directions Z, a lateral wall 81CB extending leftward from the upper end of the vertical wall 81CA, a coupling portion 81CC extending rightward from the lateral wall 81CB, and a weak portion 81CM that is provided between the lateral wall 81CB and the coupling portion 81CC and is elastically deformable in the vertical directions Z. The lateral wall 81CB is an example of a support. The vertical wall 81CA is located rightward of the left slide member 81X. The lateral wall 81CB is located above the left slide member 81X. The lateral wall 81CB is disposed on the upper surface of the left slide member 81X. The lateral wall 81CB supports the table carriage 49. One coupling portion 81CC is provided at each of the front side and the rear side of the lateral wall 81CB. The left fixing bracket 56 is coupled to the coupling portion 81CC. The vertical wall 81CA and the lateral wall 81CB are integrally formed from one flat plate by bending. The coupling portion 81CC is shaped integrally with the vertical wall 81CA and the lateral wall 81CB by punching a peripheral portion of the coupling portion 81CC across the vertical wall 81CA and the lateral wall 81CB before the vertical wall 81CA and the lateral wall 81CB are bent.

Figure 8:
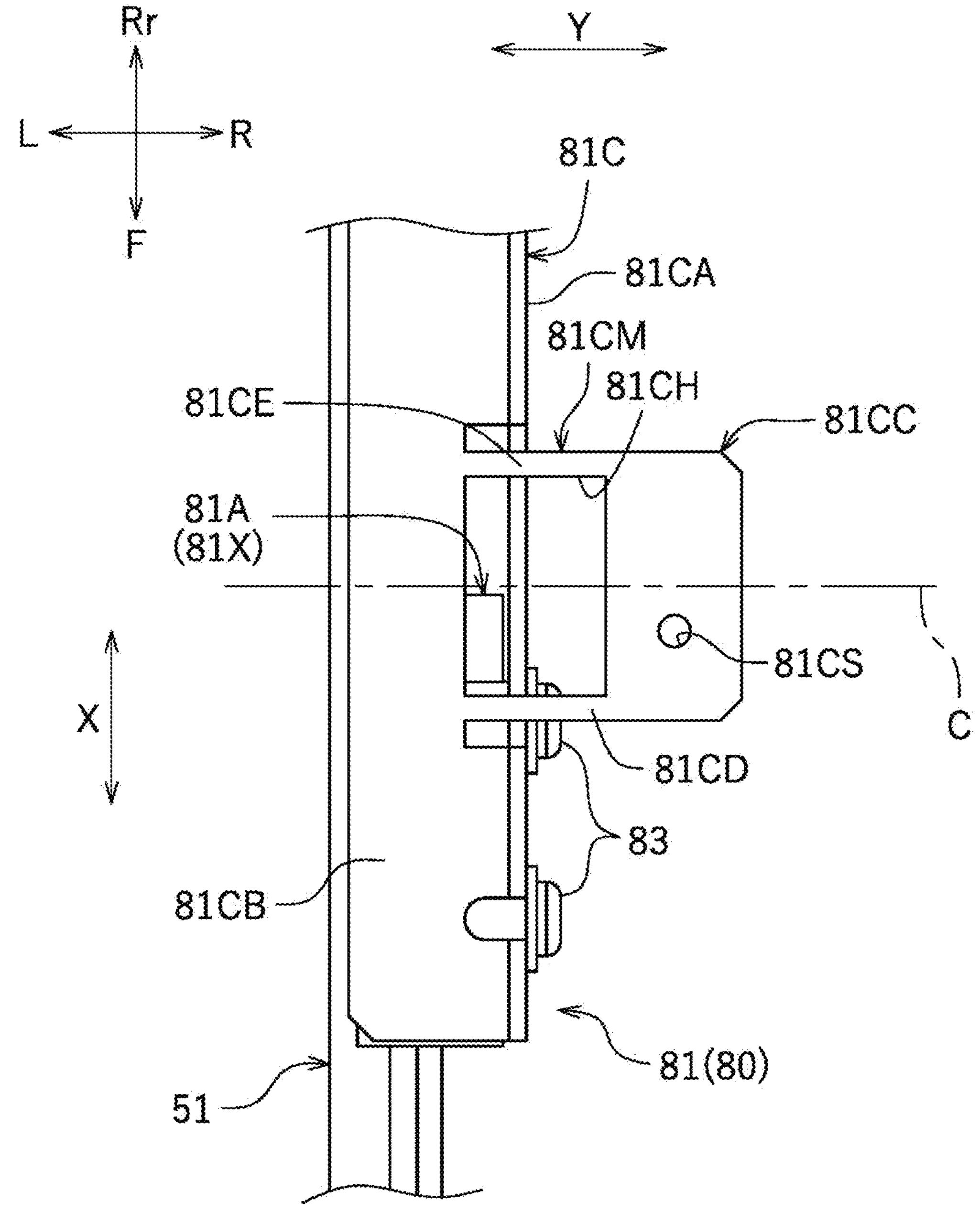
FIG. 8 is a plan view illustrating a portion of a left slide member according to a preferred embodiment of the present invention.

As illustrated in FIG. 7, the coupling portion 81CC is located above the left slide member 81X. The coupling portions 81CC extends from the left slide member 81X toward the table carriage 49 (rightward in this example). As illustrated in FIG. 8, the coupling portion 81CC has an insertion hole 81CS in which the fastening member 83 (see FIG. 9) is inserted. The fastening member 83 fastens the left fixing bracket 56 (see FIG. 9) and the coupling portion 81CC. The insertion hole 81CS penetrates the coupling portion 81CC along the vertical directions. The insertion hole 81CS is located rightward of an opening 81CH described later. The insertion hole 81CS is located forward of a center C (see FIG. 8) of the opening 81CH in the front-rear directions. The coupling portion 81CC is connected to a first portion 81CD and a second portion 810E described later of the weak portion 81CM.

As illustrated in FIG. 8, the weak portion 81CM has the opening 81CH penetrating the weak portion 81CM along the vertical directions. The weak portion 81CM includes the first portion 81CD located forward of the opening 81CH and the second portion 810E located rearward of the opening 81CH. The first portion 81CD and the second portion 810E are relatively thin, and thus, have low stiffness. Thus, the weak portion 81CM is elastically deformable in the vertical directions Z. The opening 81CH has a rectangular or substantially rectangular shape. The opening 81CH overlaps with the left slide member 81X in a plan view. The opening 81CH overlaps with the vertical wall 81CA in a plan view. Since the weak portion 81CM has the opening 81CH in this manner, the weak portion 81CM has a longitudinal stiffness lower than that of the lateral wall 81CB.

Figure 11:
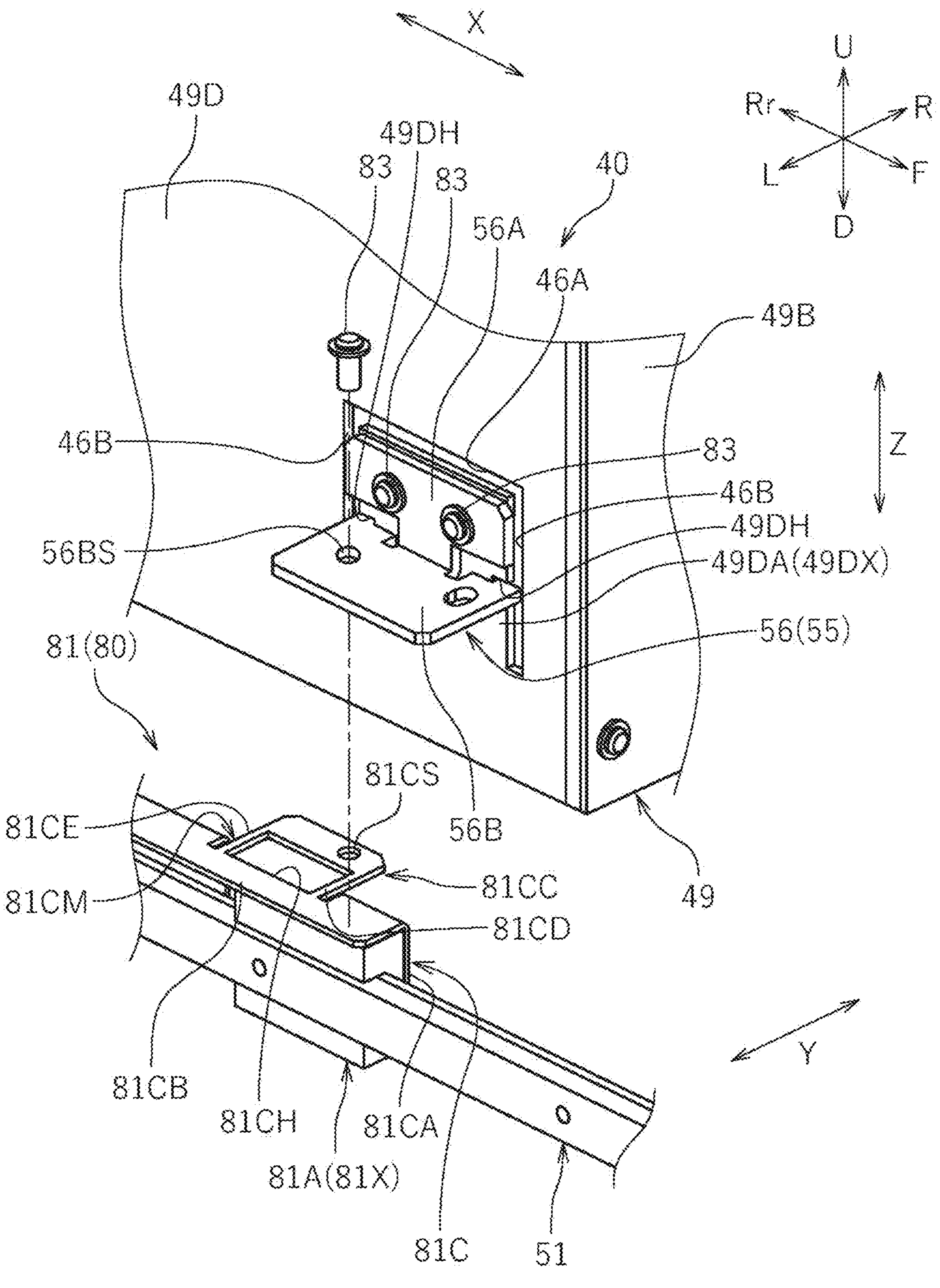
FIG. 11 is a disassembled perspective view illustrating a portion of a table unit according to a preferred embodiment of the present invention.

As illustrated in FIG. 5, the fixing bracket 55 includes the left fixing bracket 56. The left fixing bracket 56 is an example of a first fixing bracket. The left fixing bracket 56 is coupled to the left slide member 81X. The left fixing bracket 56 couples the left slide member 81X and the table carriage 49 to each other. As illustrated in FIG. 10, the left fixing bracket 56 has an L shape or substantially an L shape in a cross section. The left fixing bracket 56 has a first portion 56A to be fixed to the first fixer 49DX and a second portion 56B to be fixed to the coupling portion 81CC. The first portion 56A has a T shape or a substantially T shape. The first portion 56A is fixed to the first fixer 49DX by the fastening member 83. The second portion 56B has a rectangular or substantially rectangular shape. The second portion 56B is fixed to the coupling portion 81CC by the fastening member 83. The second portion 56B is partially inserted in a recess 49DH to be positioned in the first fixer 49DX. As illustrated in FIG. 11, the fastening member 83 is inserted in an insertion hole 56BS in the second portion 56B and the insertion hole 81CS of the coupling portion 81CC, and couples the left fixing bracket 56 and the left guide member 81 to each other.

Figure 9:
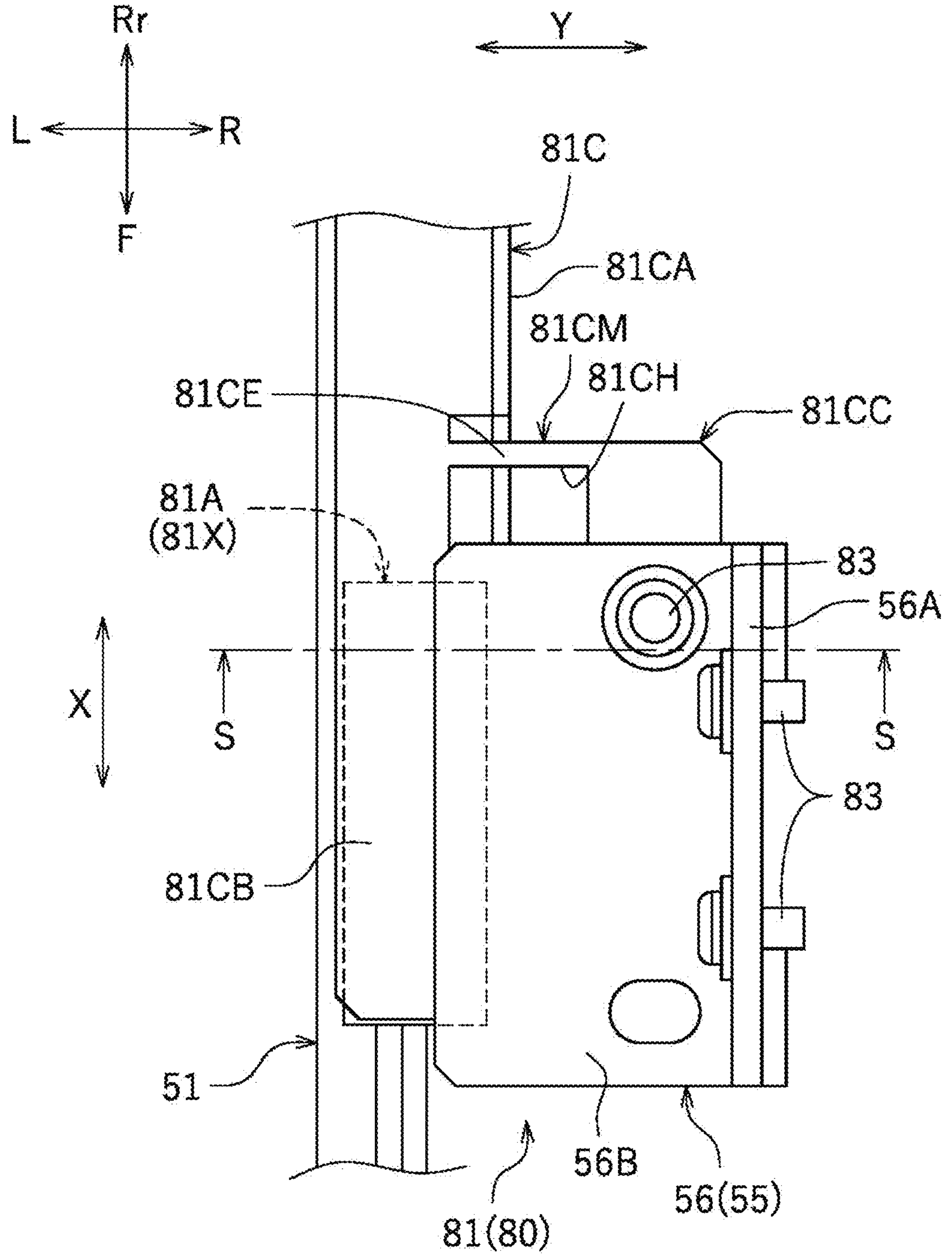
FIG. 9 is a plan view illustrating a state where a left fixing bracket is attached to a left slide member according to a preferred embodiment of the present invention.
Figure 12:
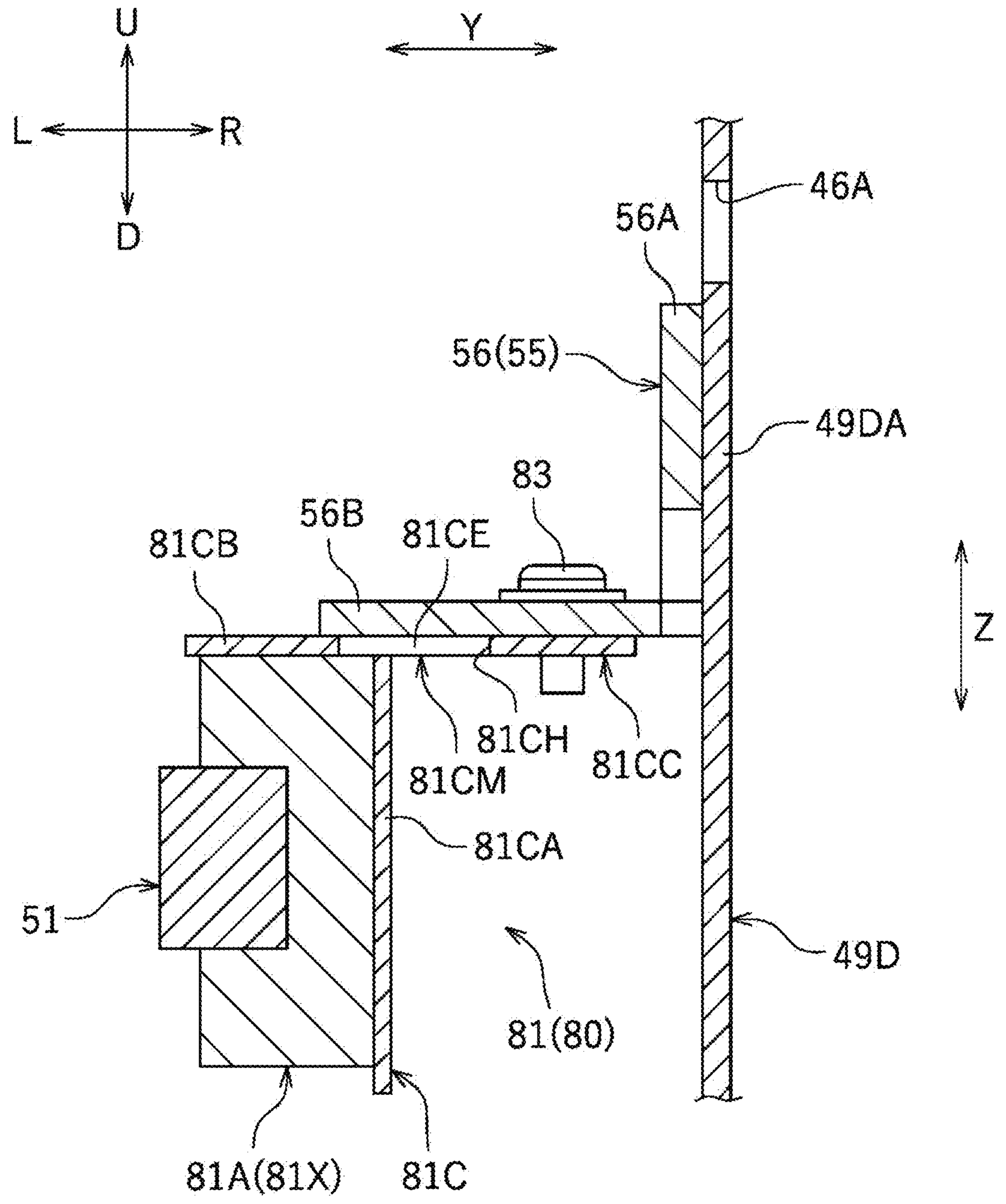
FIG. 12 is a cross-sectional view taken along line S-S in FIG. 9.

As illustrated in FIG. 9, while the left fixing bracket 56 is coupled to the left slide member 81X, a portion of the left fixing bracket 56 overlaps with the left slide member 81X in a plan view. A portion of the left fixing bracket 56 overlaps with a portion of the opening 81CH of the weak portion 81CM in a plan view. As illustrated in FIG. 12, the left fixing bracket 56 is indirectly coupled to the left slide member 81X through the left coupling member 81C. A portion of the left fixing bracket 56 is located above the lateral wall 81CB of the left coupling member 81C. Thus, the weight of the table carriage 49 (see FIG. 5) is applied to the left slide member 81X through the left fixing bracket 56 and the left coupling member 81C. That is, the table carriage 49 is supported by the left slide member 81X. In attaching the table unit 40 to the first slide rail 51 and the second slide rail 52, even if the structural elements have dimensional errors, deformation of the first left fixer 49DA, the second left fixer 49DB (see FIG. 5), and the weak portion 81CM can eliminate the dimensional errors so that the table unit 40 can be appropriately attached.

As illustrated in FIG. 6, the guide member 80 includes a right guide member 82 to be engaged with the second slide rail 52. The right guide member 82 includes a first right slide member 82A and a second right slide member 82B aligned along the sub-scanning directions X, and a right coupling member 82C retaining the first right slide member 82A and the second right slide member 82B. The first right slide member 82A and the second right slide member 82B are engaged with the second slide rail 52. The first right slide member 82A and the second right slide member 82B are movable in the sub-scanning directions X along the second slide rail 52. The first right slide member 82A and the second right slide member 82B support the table carriage 49 such that the table carriage 49 is movable in the sub-scanning directions X along the second slide rail 52. The first right slide member 82A is located forward of the second right slide member 82B. The first right slide member 82A is fixed to the front end of the right coupling member 82C. The second right slide member 82B is fixed to the rear end of the right coupling member 82C. Thus, the first right slide member 82A and the second right slide member 82B move in the sub-scanning directions X as one unit. In the following description, the first right slide member 82A and the second right slide member 82B will be collectively referred to as the right slide member 82X. The right slide member 82X is an example of a second slide member.

Figure 14:
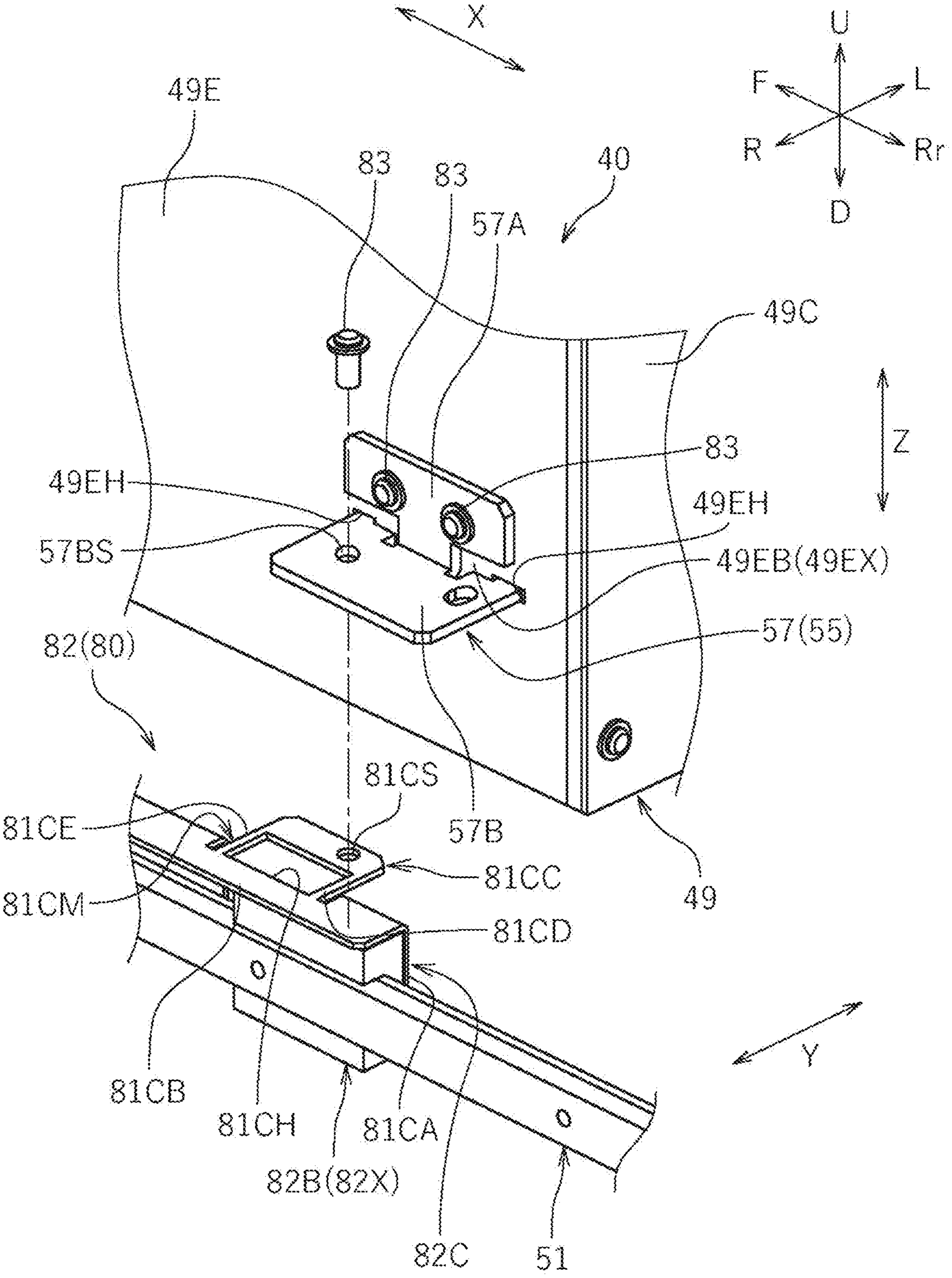
FIG. 14 is a disassembled perspective view illustrating a portion of a table unit according to a preferred embodiment of the present invention.

As illustrated in FIG. 13, the right slide member 82X is a sliding member slidable on the second slide rail 52 and has a U shape or a substantially U shape in a cross section. The right slide member 82X is fixed to the right coupling member 82C by the fastening member 83. The right coupling member 82C is provided on the right slide member 82X. The right coupling member 82C indirectly couples the right fixing bracket 57 and the right slide member 82X to each other. The right coupling member 82C has the same structure as that of the left coupling member 81C, and thus, description for the same elements and features will not be repeated. That is, the right coupling member 82C includes a vertical wall 81CA extending in the sub-scanning directions X and the vertical directions Z, a lateral wall 81CB extending rightward from the upper end of the vertical wall 81CA, a coupling portion 81CC extending leftward from the lateral wall 81CB, and a weak portion 81CM that is provided between the lateral wall 81CB and the coupling portion 81CC and elastically deformable in the vertical directions Z. As illustrated in FIG. 14, the lateral wall 81CB has an insertion hole 81CS in which the fastening member 83 is inserted. The fastening member 83 fastens the right fixing bracket 57 and the lateral wall 81CB.

As illustrated in FIG. 6, the fixing bracket 55 includes the right fixing bracket 57. The right fixing bracket 57 is an example of a second fixing bracket. The right fixing bracket 57 is coupled to the right slide member 82X. The right fixing bracket 57 couples the right slide member 82X and the table carriage 49 to each other. As illustrated in FIG. 13, the right fixing bracket 57 has an L shape or substantially an L shape in a cross section. The right fixing bracket 57 has a first portion 57A to be fixed to the second fixer 49EX and a second portion 57B to be fixed to the lateral wall 81CB. The first portion 57A has a T shape or a substantially T shape. The first portion 57A is fixed to the second fixer 49EX by the fastening member 83. The second portion 57B has a rectangular or substantially rectangular shape. The second portion 57B is fixed to the lateral wall 81CB by the fastening member 83. The second portion 57B is partially inserted in a through hole 49EH to be positioned in the second fixer 49EX. As illustrated in FIG. 14, the fastening member 83 is inserted in an insertion hole 57BS in the second portion 57B and the insertion hole 81CS of the lateral wall 81CB, and couples the right fixing bracket 57 and the right guide member 82 to each other.

While the right fixing bracket 57 is coupled to the right slide member 82X, a portion of the right fixing bracket 57 overlaps with the right slide member 82X in a plan view. As illustrated in FIG. 13, the right fixing bracket 57 is indirectly coupled to the right slide member 82X through the right coupling member 82C. A portion of the right fixing bracket 57 is located above the lateral wall 81CB of the right coupling member 82C. Thus, the weight of the table carriage 49 is applied to the right slide member 82X through the right fixing bracket 57 and the right coupling member 82C. That is, the table carriage 49 is supported by the right slide member 82X. In attaching the table unit 40 to the first slide rail 51 and the second slide rail 52, even if the structural elements have dimensional errors, deformation of the weak portion 81CM can eliminate the dimensional errors so that the table unit 40 can be appropriately attached.

As described above, in the table mover 38 according to this preferred embodiment, the first slide rail 51 extending in the sub-scanning directions X is fixed to the left side frame 64 of the base member 60 extending in the sub-scanning directions X, and the second slide rail 52 extending in the sub-scanning directions X is fixed to the right side frame 65 of the base member 60 extending in the sub-scanning directions X. In this manner, the entirety of the first slide rail 51 and the second slide rail 52 is fixed to the left side frame 64 and the right side frame 65, respectively, of the base member 60. Thus, the first slide rail 51 and the second slide rail 52 have high longitudinal stiffness. Accordingly, even when the table unit 40 moves along the first slide rail 51 and the second slide rail 52, deflection of the first slide rail 51 and the second slide rail 52 is reduced or prevented. That is, while the table unit 40 including the table 48 moves in the sub-scanning directions X, the table unit 40 moves smoothly along the first slide rail 51 and the second slide rail 52. The first left fixer 49DA and the second left fixer 49DB of the table carriage 49 are elastically deformable in the main scanning directions Y more easily than the first right fixer 49EA and the second right fixer 49EB. Thus, in attaching the table unit 40 to the first slide rail 51 and the second slide rail 52, even if the structural elements have dimensional errors, deformation of the first left fixer 49DA and the second left fixer 49DB eliminates the dimensional errors. In this manner, the first left fixer 49DA and the second left fixer 49DB are deformed more greatly than the first right fixer 49EA and the second right fixer 49EB so that the table unit 40 can be appropriately attached to the first slide rail 51 and the second slide rail 52. Consequently, the table unit 40 moves smoothly along the first slide rail 51 and the second slide rail 52.

In the table mover 38 according to this preferred embodiment, the first left fixer 49DA and the second left fixer 49DB are elastically deformable by the notch 46 extending through the table carriage 49, and the notch 46 includes the first notch 46A extending in the sub-scanning directions X above the first left fixer 49DA and the second left fixer 49DB, and the second notches 46B continuous to the first notch 46A and extending in the vertical directions at one side and the other side in the sub-scanning directions X of the first left fixer 49DA. In this manner, the first notch 46A and the second notches 46B extend around the first left fixer 49DA and the second left fixer 49DB of the table carriage 49 to which the left fixing bracket 56 is fixed. That is, the first left fixer 49DA and the second left fixer 49DB have relatively low lateral stiffness, and thus, are easily deformable.

The table mover 38 according to this preferred embodiment includes the left coupling member 81C including the lateral wall 81CB disposed on the upper surface of the left slide member 81X and supporting the table carriage 49, the coupling portion 81CC which extends from the lateral wall 81CB toward the table carriage 49 and to which the left fixing bracket 56 is coupled, and the weak portion 81CM disposed between the lateral wall 81CB and the coupling portion 81CC and elastically deformable in the vertical directions Z. In this configuration, in attaching the table unit 40 to the first slide rail 51 and the second slide rail 52, even if the structural elements have dimensional errors, elastic deformation of the weak portion 81CM in the vertical directions Z eliminates the dimensional errors. In this manner, the table unit 40 can be appropriately attached to the first slide rail 51 and the second slide rail 52 by elastically deforming the weak portion 81CM in the vertical directions Z, and thus, the table unit 40 moves smoothly along the first slide rail 51 and the second slide rail 52.

In the table mover 38 according to this preferred embodiment, the weak portion 81CM has the opening 81CH penetrating the weak portion 81CM. Accordingly, the weak portion 81CM can be easily elastically deformed in the vertical directions.

In the table mover 38 according to this preferred embodiment, a portion of the left fixing bracket 56 overlaps with the left slide member 81X in a plan view. In this configuration, the weight of the table unit 40 is applied to the left slide member 81X through the left fixing bracket 56 and the left coupling member 81C. Accordingly, even if the weight of the table unit 40 is relatively heavy, the table unit 40 is securely supported by the left slide member 81X.

In the table mover 38 according to this preferred embodiment, a portion of the left fixing bracket 56 overlaps with a portion of the opening 81CH of the left coupling member 81C in a plan view. In this configuration, excessive application of the weight of the table unit 40 to the coupling portion 81CC is reduced while deformation of the coupling portion 81CC of the left coupling member 81C is allowed.

In the table mover 38 according to this preferred embodiment, the left fixing bracket 56 has an L shape or substantially an L shape in a cross section, and includes the first portion 56A to be fixed to the first left fixer 49DA and the second left fixer 49DB and the second portion 56B to be fixed to the coupling portion 81CC. This configuration enables the first left fixer 49DA, the second left fixer 49DB, and the coupling portion 81CC to be deformed as one unit.

In the table mover 38 according to this preferred embodiment, the left slide member 81X includes the first left slide member 81A and the second left slide member 81B disposed along the sub-scanning directions X. The first left slide member 81A is fixed to one end (front end in this example)

of the left coupling member 81C in the sub-scanning directions X, and the second left slide member 81B is fixed to the other end (rear end in this example) of the left coupling member 81C in the sub-scanning directions X. This configuration enables positioning of the table unit 40 to the first left slide member 81A and the second left slide member 81B.

The printer 10 according to this preferred embodiment includes the table mover 38, the guide rail 18 disposed above the table unit 40 and extending in the sub-scanning directions X, the carriage 32 slidably disposed on the guide rail 18 and movable in the sub-scanning directions X, and the ink heads 34 including the plurality of nozzles that discharge ink onto the recording medium 5 on the table 48 and the nozzle surface including the plurality of nozzles. In the table mover 38 according to this preferred embodiment, the table unit 40 moves smoothly relative to the first slide rail 51 and the second slide rail 52. Accordingly, the printer 10 according to this preferred embodiment enables printing with high quality.

Second Preferred Embodiment

Figure 15:
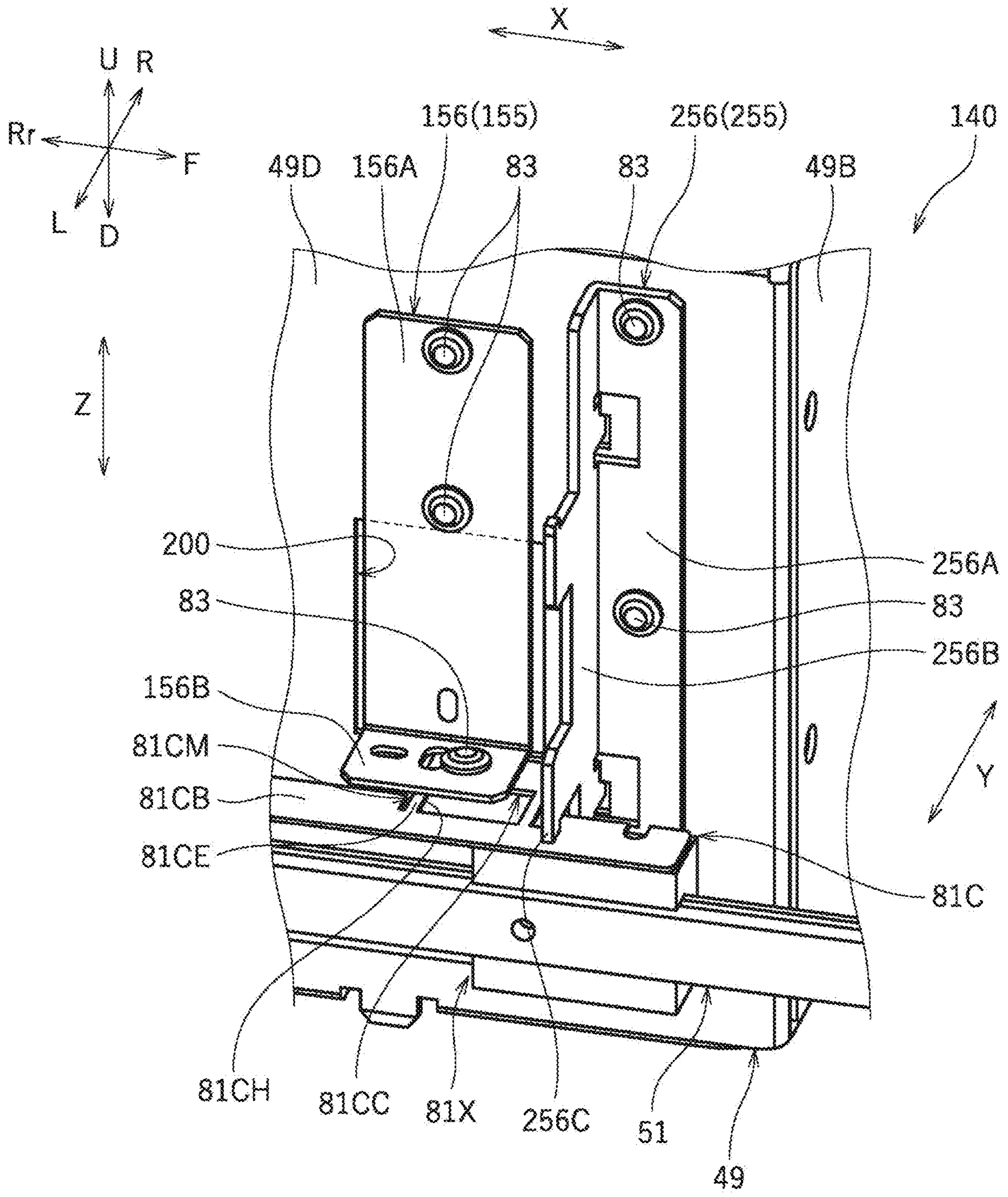
FIG. 15 is a perspective view illustrating a portion of a table unit according to a preferred embodiment of the present invention.

FIG. 15 is a perspective view illustrating a portion of a table unit 140 (table assembly) according to a second preferred embodiment. As illustrated in FIG. 15, the table unit 140 includes a fixing bracket 155 and a supporting bracket 255.

As illustrated in FIG. 15, an opening 200 extends through a left wall 49D of a table carriage 49 in main scanning directions Y. The opening 200 has a rectangular or substantially rectangular shape. The opening 200 is longer in vertical directions Z than in sub-scanning directions X. The length of the opening 200 in the vertical directions Z is smaller than the length of the fixing bracket 155 in the vertical directions Z. The length of the opening 200 in the left-right directions (sub-scanning directions X) is larger than the length of the fixing bracket 155 in the left-right directions (sub-scanning directions X). One opening 200 is provided at each of the front side and the rear side of the left wall 49D. No opening 200 is provided in a right wall 49E of the table carriage 49 (see FIG. 17).

Figure 16:
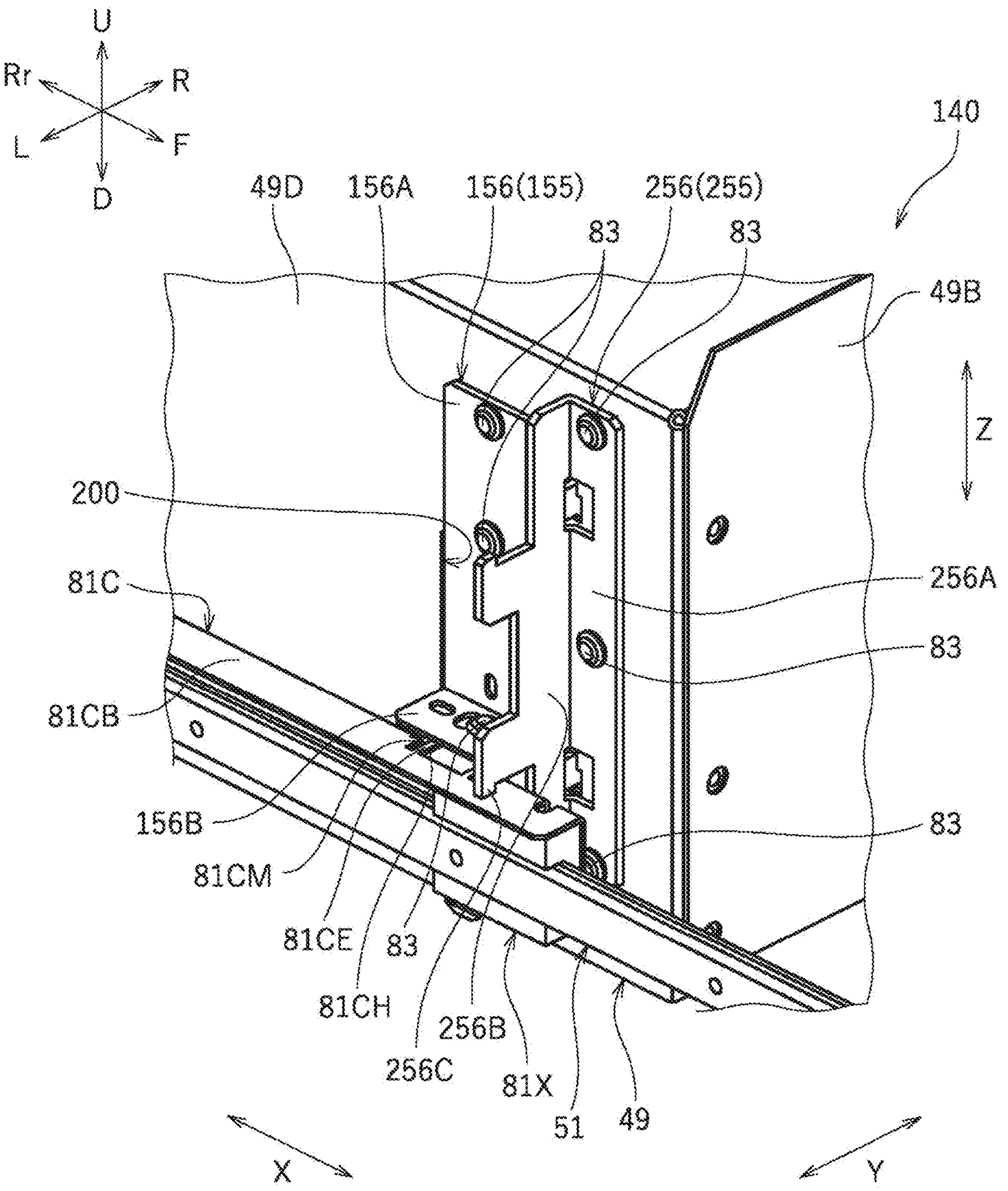
FIG. 16 is a perspective view illustrating a portion of a table unit according to a preferred embodiment of the present invention.

As illustrated in FIGS. 15 and 16, the fixing bracket 155 includes a first fixing bracket 156 fixed to the left wall 49D of the table carriage 49 and a second fixing bracket 157 (see FIG. 17) fixed to the right wall 49E (see FIG. 17) of the table carriage 49. The first fixing bracket 156 is more easily elastically deformed in the main scanning directions Y than the second fixing bracket 157. In a manner similar to the table unit 40 according to the first preferred embodiment, one first fixing bracket 156 is provided at each of the front side and the rear side of the left wall 49D, and one second fixing bracket 157 is provided at each of the front side and the rear side of the right wall 49E. In this preferred embodiment, the left wall 49D is an example of a first fixer. The right wall 49E is an example of a second fixer.

As illustrated in FIG. 15, the first fixing bracket 156 has an L shape or substantially an L shape in a cross section. The first fixing bracket 156 is fixed to the left wall 49D. A portion of the first fixing bracket 156 overlaps with the opening 200. A portion of the first fixing bracket 156 (first portion 156A described later in this preferred embodiment) is elastically deformable in the main scanning directions Y to move in the opening 200 (i.e., movable rightward). The first fixing bracket 156 is coupled to a left slide member 81X. The first fixing bracket 156 couples the left slide member 81X and the table carriage 49 to each other. The first fixing bracket 156 indirectly couples the left slide member 81X and the table carriage 49 to each other through a left coupling member 81C. The first fixing bracket 156 includes a rectangular or substantially rectangular first portion 156A fixed to the left wall 49D and a rectangular or substantially rectangular second portion 156B fixed to a coupling portion 81CC. The first portion 156A is fixed to the left wall 49D by two fastening members 83. The two fastening members 83 are located above the opening 200. The length of the first portion 156A in the sub-scanning directions X is smaller than the length of the opening 200 in the sub-scanning directions X. The front end of the first portion 156A is located rearward of the front end of the opening 200. The rear end of the first portion 156A is located forward of the rear end of the opening 200. The second portion 156B is fixed to the coupling portion 81CC by the fastening members 83. The second portion 156B is located above the lower end of the opening 200. The second portion 156B overlaps with a portion of an opening 81CH of the left coupling member 81C in a plan view.

Figure 17:
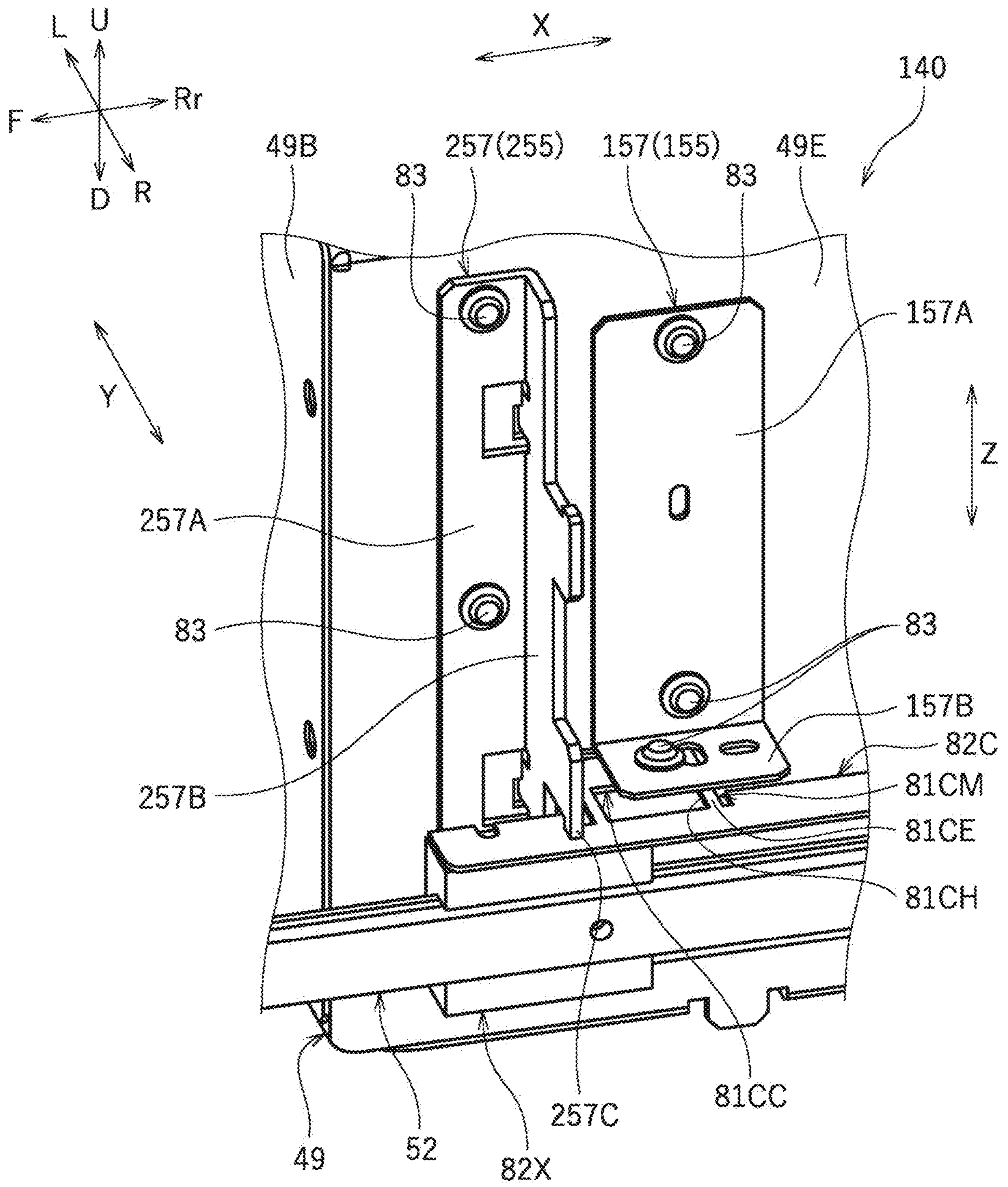
FIG. 17 is a perspective view illustrating a portion of a table unit according to a preferred embodiment of the present invention.

As illustrated in FIG. 17, the second fixing bracket 157 has an L shape or substantially an L shape in a cross section. The second fixing bracket 157 and the first fixing bracket 156 have the same shape. The second fixing bracket 157 is fixed to the right wall 49E. The second fixing bracket 157 is coupled to a right slide member 82X. The second fixing bracket 157 couples the right slide member 82X and the table carriage 49 to each other. The second fixing bracket 157 indirectly couples the right slide member 82X and the table carriage 49 through a right coupling member 82C. The second fixing bracket 157 has a rectangular or substantially rectangular first portion 157A fixed to the right wall 49E and a rectangular or substantially rectangular second portion 157B fixed to the coupling portion 81CC. The first portion 157A is fixed to the right wall 49E by two fastening members 83. The two fastening members 83 are located near the upper end and the lower end of the first portion 157A, respectively. The entire first portion 157A is in surface contact with the right wall 49E. Thus, the second fixing bracket 157 is not easily deformed in the main scanning directions Y (leftward in this preferred embodiment). Since the right wall 49E does not include the opening 200 unlike the left wall 49D as described above, the second fixing bracket 157 is less easily elastically deformed in the main scanning directions Y than the first fixing bracket 156. The second portion 157B is fixed to the coupling portion 81CC by the fastening members 83. The second portion 157B overlaps with a portion of the opening 81CH of the right coupling member 82C in a plan view.

As illustrated in FIG. 15, the supporting bracket 255 includes a first supporting bracket 256 fixed to the left wall 49D of the table carriage 49 and a second supporting bracket 257 (see FIG. 17) fixed to the right wall 49E (see FIG. 17) of the table carriage 49. One first supporting bracket 256 is provided at each of the front side and the rear side of the left wall 49D, and one second supporting bracket 257 is provided at each of the front side and the rear side of the right wall 49E.

As illustrated in FIG. 16, the first supporting bracket 256 is fixed to the left wall 49D. The first supporting bracket 256 is fixed to the left wall 49D by three fastening members 83. The first supporting bracket 256 is located forward of the first fixing bracket 156. The first supporting bracket 256 may be located rearward of the first fixing bracket 156. The first supporting bracket 256 is supported by the left slide member 81X from below. The first supporting bracket 256 is indirectly supported by the left slide member 81X from below through the left coupling member 81C. Accordingly, the weight of the table carriage 49 is applied to the left slide member 81X. The first supporting bracket 256 has an L shape or substantially an L shape in a cross section. The first supporting bracket 256 includes a first fixing portion 256A fixed to the left wall 49D of the table carriage 49 and a first coupling portion 256B extending leftward from the rear end of the first fixing portion 256A. The first coupling portion 256B includes a first supported portion 256C supported by the left slide member 81X from below. The first fixing portion 256A extends in the vertical directions Z and the sub-scanning directions X. The first coupling portion 256B extends in the vertical directions Z and the main scanning directions Y. The first supported portion 256C is in contact with the left coupling member 81C.

As illustrated in FIG. 17, the second supporting bracket 257 is fixed to the right wall 49E. The second supporting bracket 257 is fixed to the right wall 49E by three fastening members 83 (one of which is not shown). The second supporting bracket 257 is located forward of the second fixing bracket 157. The second supporting bracket 257 may be located rearward of the second fixing bracket 157. The second supporting bracket 257 is supported by the right slide member 82X from below. The second supporting bracket 257 is indirectly supported by the right slide member 82X from below through the right coupling member 82C. Accordingly, the weight of the table carriage 49 is applied to the right slide member 82X. The second supporting bracket 257 has an L shape or substantially an L shape in a cross section. The second supporting bracket 257 and the first supporting bracket 256 have the same shape. The second supporting bracket 257 includes a second fixing portion 257A fixed to the right wall 49E of the table carriage 49 and a second coupling portion 257B extending rightward from the rear end of the second fixing portion 257A. The second coupling portion 257B includes a second supported portion 257C supported by the right slide member 82X from below. The second fixing portion 257A extends in the vertical directions Z and the sub-scanning directions X. The second coupling portion 257B extends in the vertical directions Z and the main scanning directions Y. The second supported portion 257C is in contact with the right coupling member 82C.

In the manner described above, in the table unit 140 according to the second preferred embodiment, a portion elastically deformable in the main scanning directions Y (first fixing bracket 156 in this preferred embodiment) and a portion subjected to application of the weight of the table carriage 49 (supporting bracket 255 in this preferred embodiment) are defined by different structural elements, whereas these structural elements are integrated in the table unit 40 according to the first preferred embodiment. Since these portions are defined by different structural elements, lateral stiffness can be changed only by replacing the first fixing brackets 156 without replacing the supporting brackets 255.

As described above, in the table mover 38 according to this preferred embodiment, the first fixing bracket 156 is more easily elastically deformable in the main scanning directions Y than the second fixing bracket 157. Thus, in attaching the table unit 140 to a first slide rail 51 and a second slide rail 52, even if the structural elements have dimensional errors, deformation of the first fixing bracket 156 eliminates the dimensional errors. In this manner, the first fixing bracket 156 is deformed more greatly than the second fixing bracket 157 so that the table unit 140 can be appropriately attached to the first slide rail 51 and the second slide rail 52. Consequently, the table unit 140 moves smoothly along the first slide rail 51 and the second slide rail 52.

In the table mover 38 according to this preferred embodiment, the left wall 49D includes the opening 200 extending through the left wall 49D in the main scanning directions Y, and a portion of the first fixing bracket 156 overlaps with the opening 200 and is elastically deformable in the main scanning directions Y to be movable in the opening 200. In the preferred embodiment described above, the first fixing bracket 156 is easily elastically deformable in the main scanning directions Y, and thus, even if structural elements have dimensional errors in attaching the table unit 140 to the first slide rail 51 and the second slide rail 52, these dimensional errors are eliminated.

The table mover 38 according to this preferred embodiment includes the first supporting bracket 256 located at the left wall 49D of the table carriage 49 and supported by the left slide member 81X from below and the second supporting bracket 257 located at the right wall 49E of the table carriage 49 and supported by the right slide member 82X from below. In the preferred embodiment described above, the weight of the table carriage 49 is applied to the left slide member 81X and the right slide member 82X having relatively high stiffness through the first supporting bracket 256 and the second supporting bracket 257. Thus, even if a recording medium 5 placed on a table 48 is relatively heavy, parallelism of the recording medium 5 is maintained.

In the table mover 38 according to this preferred embodiment, the first supporting bracket 256 includes the first fixing portion 256A having an L shape or substantially an L shape in a cross section and fixed to the table carriage 49, and the first coupling portion 256B including the first supported portion 256C supported by the left slide member 81X from below, and the second supporting bracket 257 includes the second fixing portion 257A having an L shape or substantially an L shape in a cross section and fixed to the table carriage 49, and the second coupling portion 257B including the second supported portion 257C supported by the right slide member 82X from below. In the preferred embodiment described above, the weight of the table carriage 49 is applied to the left slide member 81X and the right slide member 82X having relatively high stiffness through the first supported portion 256C and the second supported portion 257C.

The foregoing description is directed to the preferred embodiments of the present invention. The preferred embodiments described above, however, are merely examples, and the present invention can be performed in various other preferred embodiments, examples, modifications, combinations, etc.

Although the first notch 46A is above the first fixer 49DX in the first preferred embodiment described above, the first notch 46A may be below the first fixer 49DX.

The weak portion 81CM is provided in each of the left coupling member 81C and the right coupling member 82C in the first preferred embodiment described above, but may be provided only in the left coupling member 81C.

In the first preferred embodiment described above, the table unit 40 includes no supporting bracket, but may include a supporting bracket 255 similar to that of the second preferred embodiment. In this case, a portion of the left fixing bracket 56 may not include the left slide member 81X in a plan view. That is, the weight of the table unit 40 does not need to be applied to the left slide member 81X through the left fixing bracket 56 and the left coupling member 81C.

In the second preferred embodiment described above, the table unit 140 includes the supporting bracket 255. Alternatively, the table unit 140 may not include the supporting bracket 255.

The notch 46 is provided around the first left fixer 49DA and the second left fixer 49DB in the preferred embodiments described above, but may be provided around the first right fixer 49EA and the second right fixer 49EB.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A table mover comprising:
- a base including:
  - a bottom wall;
  - a first side wall extending upward from the bottom wall in a first direction; and
  - a second side wall extending upward from the bottom wall in the first direction and separated from the first side wall in a second direction, the second direction being perpendicular or substantially perpendicular to the first direction in a plan view;
- a first slide rail fixed to the first side wall and extending in the first direction;
- a second slide rail fixed to the second side wall and extending in the first direction;
- a table assembly including a table on which a recording medium is placeable and a table carriage to support the table, the table assembly being movable in the first direction along the first slide rail and the second slide rail;
- a first slider to be engaged with the first slide rail and to support the table carriage such that the table carriage is movable in the first direction along the first slide rail;
- a second slider to be engaged with the second slide rail and to support the table carriage such that the table carriage is movable in the first direction along the second slide rail;
- a first fixing bracket to couple the first slider and the table carriage to each other; and
- a second fixing bracket to couple the second slider and the table carriage to each other; wherein
- the table carriage includes a first fixer and a second fixer, the first fixer being provided at one side in the second direction, the first fixing bracket being fixed to the first fixer, the second fixer being provided at another side in the second direction, the second fixing bracket being fixed to the second fixer; and
- the first fixer is more easily elastically deformed in the second direction than the second fixer.

2. The table mover according to claim 1, wherein
- the first fixer is elastically deformable by a notch in the table carriage; and
- the notch includes:
  - a first notch extending in the first direction above or below the first fixer; and
  - a second notch continuous with the first notch and extending in a vertical direction at each of one side and another side of the first fixer in the first direction.

3. The table mover according to claim 1, further comprising a coupler including:
- a support provided on an upper surface of the first slider and supporting the table carriage;
- a coupling portion extending from the support toward the table carriage, the first fixing bracket being coupled to the coupling portion; and
- a weak portion between the support and the coupling portion and being elastically deformable in a third direction perpendicular or substantially perpendicular to the second direction.

4. The table mover according to claim 3, wherein the weak portion includes an opening extending through the weak portion.

5. The table mover according to claim 4, wherein a portion of the first fixing bracket overlaps with the first slider in a plan view.

6. The table mover according to claim 5, wherein a portion of the first fixing bracket overlaps with a portion of the opening of the coupler in a plan view.

7. The table mover according to claim 4, wherein the first fixing bracket has an L shape or substantially an L shape in a cross section, and includes a first portion to be fixed to the first fixer and a second portion to be fixed to the coupling portion.

8. The table mover according to claim 4, wherein
- the first slider includes a front first slider and a rear first slider aligned along the first direction;
- the front first slider is fixed to an end of the coupler in the first direction; and
- the rear first slider is fixed to another end of the coupler in the first direction.

9. The table mover according to claim 1, further comprising:
- a first supporting bracket provided at one side of the table carriage in the second direction and supported by the first slider from below; and
- a second supporting bracket provided at another side of the table carriage in the second direction and supported by the second slider from below.

10. The table mover according to claim 9, wherein
- the first supporting bracket includes:
  - a first fixing portion with an L shape or substantially an L shape in a cross section and fixed to the table carriage; and
  - a first coupling portion including a first supported portion supported by the first slider from below; and
- the second supporting bracket includes:
  - a second fixing portion with an L shape or substantially an L shape in a cross section and fixed to the table carriage; and
  - a second coupling portion including a second supported portion supported by the second slider from below.

11. An ink jet printer comprising:
- the table mover according to claim 1;
- a guide rail located above the table assembly and extending in the second direction;
- a carriage slidably located on the guide rail and movable in the second direction; and
- an ink head mounted on the carriage and including a plurality of nozzles and a nozzle surface including the plurality of nozzles to discharge ink onto the recording medium on the table.

12. A table mover comprising:
- a base including:
  - a bottom wall;
  - a first side wall extending upward from the bottom wall in a first direction; and
  - a second side wall extending upward from the bottom wall in the first direction and separated from the first side wall in a second direction, the second direction being perpendicular or substantially perpendicular to the first direction in a plan view;

a first slide rail fixed to the first side wall and extending in the first direction;

a second slide rail fixed to the second side wall and extending in the first direction;

a table assembly including a table on which a recording medium is placeable and a table carriage to support the table, the table assembly being movable in the first direction along the first slide rail and the second slide rail;

a first slider to be engaged with the first slide rail and to support the table carriage such that the table carriage is movable in the first direction along the first slide rail;

a second slider to be engaged with the second slide rail and to support the table carriage such that the table carriage is movable in the first direction along the second slide rail;

a first fixing bracket to couple the first slider and the table carriage to each other; and a second fixing bracket to couple the second slider and the table carriage to each other; wherein the table carriage includes a first fixer and a second fixer, the first fixer being provided at one side in the second direction, the first fixing bracket being fixed to the first fixer, the second fixer being provided at another side in the second direction, the second fixing bracket being fixed to the second fixer; and the first fixing bracket is more easily elastically deformed in the second direction than the second fixing bracket.

13. The table mover according to claim 12, wherein the first fixer includes an opening extending through the first fixer in the second direction; and a portion of the first fixing bracket overlaps with the opening and is elastically deformable in the second direction to be movable in the opening.

14. The table mover according to claim 12, further comprising a coupler including:

a support provided on an upper surface of the first slider and supporting the table carriage;

a coupling portion extending from the support toward the table carriage, the first fixing bracket being coupled to the coupling portion; and a weak portion between the support and the coupling portion and being elastically deformable in a third direction, the third direction being perpendicular or substantially perpendicular to the second direction.

15. The table mover according to claim 14, wherein the weak portion includes an opening extending through the weak portion.

16. The table mover according to claim 15, wherein a portion the first fixing bracket overlaps with a portion of the opening of the coupler in a plan view.

17. The table mover according to claim 15, wherein the first fixing bracket includes:

a first portion with an L shape or substantially an L shape in a cross section and fixed to the first fixer; and a second portion fixed to the coupling portion.

18. The table mover according to claim 15, wherein the first slider includes a front first slider and a rear first slider extending along the first direction;

the front first slider is fixed to an end of the coupler in the first direction; and the rear first slider is fixed to another end of the coupler in the first direction.

19. The table mover according to claim 12, further comprising:

a first supporting bracket provided at one side of the table carriage in the second direction and supported by the first slider from below; and a second supporting bracket provided at another side of the table carriage in the second direction and supported by the second slider from below.

20. An ink jet printer comprising:

the table mover according to claim 12;

a guide rail located above the table assembly and extending in the second direction;

a carriage slidably located on the guide rail and movable in the second direction; and an ink head mounted on the carriage and including a plurality of nozzles and a nozzle surface including the plurality of nozzles to discharge ink onto the recording medium on the table.

* * * * *